United States Patent
Hanazawa et al.

(10) Patent No.: US 7,320,253 B2
(45) Date of Patent: Jan. 22, 2008

(54) STRESS DETECTION METHOD FOR SENSOR DEVICE WITH MULTIPLE AXIS SENSOR AND SENSOR DEVICE EMPLOYING THIS METHOD

(75) Inventors: Toshio Hanazawa, Kanagawa (JP); Masaaki Ono, Kanagawa (JP); Tsutomu Miyashita, Kanagawa (JP); Hiroshi Tokunaga, Kanagawa (JP); Hiroshi Ishikawa, Kawasaki (JP)

(73) Assignees: Fujitsu Media Devices Limited, Yokohama (JP); Fujitsu Limited, Kawasaki (JP)

(*) Notice: Subject to any disclaimer, the term of this patent is extended or adjusted under 35 U.S.C. 154(b) by 82 days.

(21) Appl. No.: 11/073,944

(22) Filed: Mar. 8, 2005

(65) Prior Publication Data
US 2005/0229720 A1 Oct. 20, 2005

(30) Foreign Application Priority Data
Apr. 1, 2004 (JP) ............... 2004-109344
Jul. 13, 2004 (JP) ............... 2004-206434

(51) Int. Cl.
*G01P 15/125* (2006.01)
(52) U.S. Cl. ............ 73/862.042; 73/1.37; 73/1.38; 73/1.77; 73/1.78; 73/493; 73/504.02; 73/862.043
(58) Field of Classification Search .......... 73/1.37, 73/1.38, 1.77, 1.78, 493, 504.02, 862.042, 73/862.043
See application file for complete search history.

(56) References Cited

U.S. PATENT DOCUMENTS 5,686,665 A * 11/1997 Hara et al. ............ 73/495
5,719,336 A    2/1998 Ando et al.
5,894,091 A *  4/1999 Kubota ................ 73/504.12
6,347,541 B1 * 2/2002 Maleki ................. 73/1.38
6,810,735 B2  11/2004 Kaneko et al.
2005/0028590 A1* 2/2005 Kaneko et al. .......... 73/495
2005/0038597 A1* 2/2005 Kaneko et al. ......... 701/200

FOREIGN PATENT DOCUMENTS

| EP | 0 742 428 A1 | 11/1996 |
| EP | 0 810 441 A2 | 12/1997 |
| EP | 1 335 186 A1 | 8/2003 |
| JP | 04-148833 | 5/1992 |
| JP | 04-249726 | 9/1992 |
| JP | 08-094661 | 4/1996 |
| JP | 09-113535 | 5/1997 |
| JP | 2002-213963 | 7/2002 |
| JP | 2003-227844 | 8/2003 |

* cited by examiner

*Primary Examiner*—Edward Lefkowitz
*Assistant Examiner*—Freddie Kirkland, III
(74) *Attorney, Agent, or Firm*—Arent Fox LLP

(57) ABSTRACT

The present invention provides the stress detection method for force sensor device with multiple axis sensor device and force sensor device employing this method, whose installation angle is arbitrary. The stress detection method includes, first and second force sensors whose detection axes are orthogonal to each other. When the detection axis of first force sensor forms angle θ with direction of detected stress Ax, and the stress component of direction perpendicular to direction of the detected stress Ax is Az, output Apx of the axis direction of first force sensor is found as $Apx=\alpha_x(Ax\times\cos\theta+Az\times\sin\theta)$, and output Apz of the axis direction of the second force sensor is found as $Apz=\alpha_z(Ax\times\sin\theta+Az\times\cos\theta)$, and, when $\alpha_x$ and $\alpha_z$ are detection sensitivity coefficients of first and second force sensors respectively, the detection sensitivity coefficient $\alpha_z$ of second force sensor is set as $\alpha_z=\alpha_x\tan\theta$, and the detected stress Ax is found as $Ax=(Apx-Apz)/\alpha_x(\cos\theta-\tan\theta\times\sin\theta)$.

11 Claims, 15 Drawing Sheets

FIG. 4
| ASPECT | DETECTION AXES | ACCERATION DIRECTION | THE CONDITION FOR THE SENSIBITY OF EACH SENSOR |
|---|---|---|---|
| I | X+Z | X-axis | $\alpha_z = \alpha_x \tan\theta$ |
| II | Y+Z | Y-axis | $\alpha_z = \alpha_y \tan\theta$ |
| III | x+y+Z | x y plane | $\alpha_z = (\alpha x + \alpha y) \times \tan\theta$ |
FIG. 5A
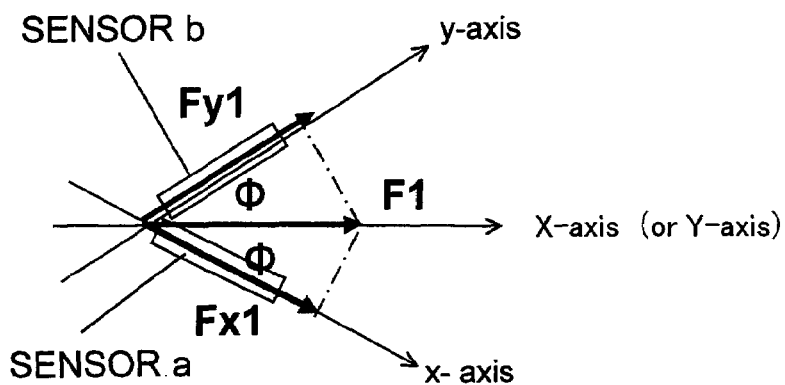
FIG. 5B
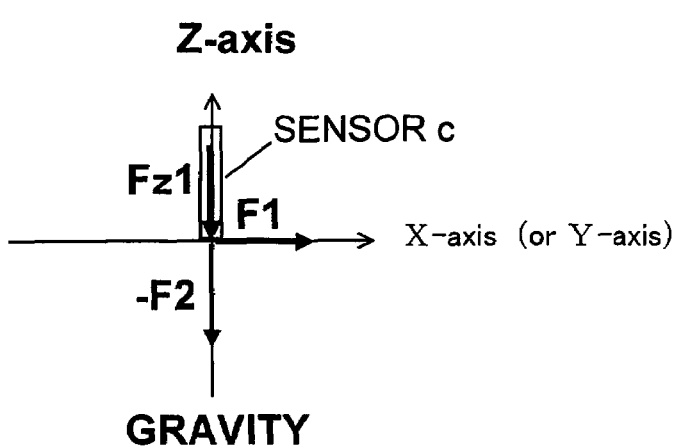

( ) Z-direction

← X(Y)

↓ Z

STRESS DETECTION METHOD FOR SENSOR DEVICE WITH MULTIPLE AXIS SENSOR AND SENSOR DEVICE EMPLOYING THIS METHOD

BACKGROUND OF THE INVENTION

1. Field of the Invention

The present invention relates to a stress detection method for a force sensor device with a multiple axis sensor and a force sensor device employing this method.

2. Description of the Related Art

For varied control of mobile bodies such as automobiles and ships, robots and machine manufacturing equipment or mobile devices that are held and used by users such as notebook PCs, cellular phones, PDAs (Personal Digital Assistants), DVCs (Digital Video Cameras), DSCs (Digital Still Cameras) and so forth, for example, detection of the stress on all or part of a target according to the control objective is essential. Acceleration can be sensed by sensing the stress on the basis of the acceleration acting on all or part of the target.

A variety of devices for detecting this stress or acceleration has been developed conventionally. As one such device, a device that forms a gauge resistance on a semiconductor substrate and converts the resultant mechanical distortion on the basis of the force exerted from the outside into an electrical signal by means of the piezoresistive effect is known ("3-axis sensor development" 'Inventions' Journal, pages 52 to 63, September 2003; issued by the Invention society). In addition, the fact that changes in the electrostatic capacity corresponding to the distortion can also be utilized instead of using the piezoresistive effect of the gauge resistance is explained in "3-axis sensor development" 'Inventions' Journal, pages 52 to 63, September 2003; issued by the Invention society.

In particular, the invention described in "3-axis sensor development" 'Inventions' Journal, pages 52 to 63, September 2003; issued by the Invention society is characterized in that sensors of a plurality of types, that is, four types of sensor, namely a 3-axis force sensor, a 3-axis acceleration sensor, a 3-axis angular velocity sensor, and a 6-axis motion sensor can be constituted in one device by means of force sensors in a plurality of axis directions that are formed on the semiconductor substrate.

Further, when an acceleration sensor for sensing vehicle acceleration is used for vehicle brake control and so forth, a fault with the acceleration sensor causes unnecessary braking or an unstable state such as vehicle spin is judged. Therefore, a device for detecting acceleration sensor anomalies that serves to prevent such problems has been proposed (Japanese Patent Application Laid Open No. H9-113535). In the case of the invention of Japanese Patent Application Laid Open No. H9-113535, two acceleration sensors are each placed to form equal angles with an axis along front or rear direction of the vehicle and judging means that judge an anomaly with the one acceleration sensor, when a state in which the fluctuation width of the detected acceleration of either one of the acceleration sensors is less than a predetermined value continues for a predetermined time, and the fluctuation width of the detected angular velocity of the other acceleration sensor simultaneously exceeds a predetermined value.

In addition, as another invention, one technique that solves a problem where the direction of the detection axis in which the acceleration sensor detects and the direction of the physical quantity that is actually delivered to the sensor do not match has been proposed (Japanese Patent Application Laid Open No. 2003-227844).

The problem where the direction of the detection axis in which the acceleration sensor detects and the direction of the physical quantity that is actually delivered to the sensor do not match occurs in the following case, for example.

That is, in the case of a navigation device mounted in a vehicle, as the acceleration sensor finds the current position of the vehicle and, as a reference when detecting the displacement direction of the vehicle from a point of reference or a change in velocity, the sensor is equipped with a detection axis that is established in a fixed direction.

Thus, no problems occur when the direction of the detection axis matches the direction of the actual acceleration. However, generally, in cases where the navigation device is mounted in a vehicle, there are frequent cases where the navigation device is mounted tilted due to restrictions with the vehicle-mounting structure and the relationship with the interior and so forth. In this case, the direction of the detection axis and the direction of the actual acceleration do not match and the detected component in the direction perpendicular to the detection axis appears as noise. As a result, detection errors occur so that accurate positional measurement is difficult. Therefore, in order to deal with this problem, the mount angle in the vehicle is specified beforehand, and a built-in program corrects errors in the specified mount angle.

In view of the above facts, the invention that appears in Japanese Patent Application Laid Open No. 2003-227844 is constituted so that the sensor is attached at an angle in advance, in order that the specified mount angle at which the navigation device is mounted in the vehicle is cancelled, and the direction of the detection axis matches that of the actual acceleration, when the sensor equipped for a navigation device is mounted.

The 3-axis sensor development" 'Inventions' Journal, pages 52 to 63, September 2003; issued by the Invention society and the Japanese Patent Application Laid Open No. H9-113535 make no mention at all of problems arising from measurement errors caused by unnecessary outputs in the direction of the detection axis and the perpendicular direction. On the other hand, Japanese Patent Application Laid Open No. 2003-227844 discloses a method in which the mount angle of the sensor is pre-adjusted when a sensor is mounted on a sensor device in correspondence with the specified mount angle.

Therefore, in the case of Japanese Patent Application Laid Open No. 2003-227844, sensor devices with corresponding sensor mount angles must be prepared for each specified mount angle and therefore cannot be used generically for a variety of specified mount angles.

SUMMARY OF THE INVENTION

Based on these facts, an object of the present invention is to provide a stress detection method for a force sensor device with a multiple axis sensor and a force sensor device employing this method and, more particularly, to free the actual mount angle of the sensor device.

A stress detection method for a force sensor device with a multiple axis sensor that solves the above problem of the present invention comprises, according to a first aspect, as the multiple axis sensor, first and second force sensors the detection axes of which are orthogonal to one other, wherein, when the detection axis of the first force sensor forms an angle θ with the axis direction in which detected stress Ax is delivered and the stress component of an axis direction that is perpendicular to the axis in which the detected stress Ax is delivered is Az, an output Apx of the axis direction of the first force sensor is found as $Apx=\alpha_x(Ax\times\cos\theta+Az\times\sin\theta)$, and an output Apz of the axis direction of the second force sensor is found as $Apz=\alpha_z(Ax\times\sin\theta+Az\times\cos\theta)$, and, when $\alpha_x$ and $\alpha_z$ are detection sensitivity coefficients of the first and second force sensors respectively, the detection sensitivity coefficient $\alpha_z$ of the second force sensor is set as $\alpha_z=\alpha_x\tan\theta$, the difference Apx−Apz between the output Apx and output Apz is found, and the detected stress Ax is found from the difference as $Ax=(Apx-Apz)/\alpha_x(\cos\theta-\tan\theta\times\sin\theta)$.

A stress detection method for a force sensor device with a multiple axis sensor that solves the above problem of the present invention is, according to a second aspect, a stress detection method for a force sensor device with a multiple axis sensor that comprises, as the multiple axis sensor, first and second force sensors that form an angle Φ in mutually opposite directions with the axis direction in which the detected stress F1 is delivered; and a third force sensor with a detection axis in a direction that is perpendicular to the plane formed by the detection axes of the first and second force sensors, wherein, when the plane formed by the first and second force sensors forms an angle θ with the axis direction in which the detected stress F1 is delivered and the stress component in an axis direction that is perpendicular to the axis in which the detected stress F1 is delivered is F2, an output Fx of the axis direction of the first force sensor is found as $Fx=\alpha_x\times(F1\times\cos\Phi\times\cos\theta-F2\times\sin\theta)$, an output Fy of an axis direction of the second force sensor is found as $Fy=\alpha_y\times(F1\times\cos\Phi\times\cos\theta-F2\times\sin\theta)$, an output Fz of an axis direction of the second force sensor is found as $Fz=\alpha_z\times(F1\times\sin\theta-F2\times\cos\theta)$, and the combined output F of the outputs Fx, Fy and Fz is found as $F=Fx+Fy-Fz$; and, when $\alpha_x$, $\alpha_y$, and $\alpha_z$ are detection sensitivity coefficients of the first, second, and third force sensors respectively, the detection sensitivity coefficient $\alpha_z$ of the third force sensor is $\alpha_z=(\alpha_x+\alpha_y)\times\tan\theta$, and the detected stress F1 is then found from the composite output F as $F1=F/\{(\alpha_x+\alpha_y)\cos\Phi\times\cos\theta-\alpha_z\times\sin\theta\}$.

The first aspect of the force sensor device with a multiple axis sensor that solves the above problem of the present invention comprises first and second force sensors the detection axes of which are mutually orthogonal; and a circuit for processing the outputs of the first and second force sensors, wherein, when the detection axis of the first force sensor forms an angle θ with the axis direction in which the detected stress Ax is delivered and the stress component of an axis direction that is perpendicular to the axis in which the detected stress Ax is delivered is Az, the circuit outputs: $Apx=\alpha_x(Ax\times\cos\theta+Az\times\sin\theta)$ as an output Apx of the axis direction of the first force sensor, and $Apz=\alpha_z(Ax\times\sin\theta+Az\times\cos\theta)$ as an output Apz in the axis direction of the second force sensor, where $\alpha_x$ and $\alpha_z$ are detection sensitivity coefficients of the first and second force sensors respectively and the detection sensitivity coefficient $\alpha_z$ of the second force sensor is set as $\alpha_z=\alpha_x\tan\theta$; the difference Apx−Apz between the output Apx and output Apz is found; and the detected stress Ax is detected from the difference and outputted as $Ax=(Apx-Apz)/\alpha_x(\cos\theta-\tan\theta\times\sin\theta)$.

The second aspect of the force sensor device with a multiple axis sensor that solves the above problem of the present invention is a force sensor device with a multiple axis sensor that comprises, as the multiple axis sensor, first and second force sensors that form an angle Φ in mutually opposite directions with the axis direction in which the detected stress F1 is delivered; and a third force sensor with a detection axis in a direction that is perpendicular to the plane formed by the detection axes of the first and second force sensors, wherein the plane formed by the first and second force sensors forms an angle θ with the axis direction in which the detected stress F1 is delivered, the force sensor device further comprising: a circuit that processes the outputs of the first, second, and third force sensors, such that, when the stress component in an axis direction that is perpendicular to the axis in which the detected stress F1 is delivered is F2, the circuit outputs: an output Fx of the axis direction of the first force sensor as $Fx=\alpha_x\times(F1\times\cos\Phi\times\cos\theta-F2\times\sin\theta)$, an output Fy of the axis direction of the second force sensor as $Fy=\alpha_y\times(F1\times\cos\Phi\times\cos\theta-F2\times\sin\theta)$, an output Fz of the axis direction of the second force sensor as $Fz=\alpha_z\times(F1\times\sin\theta-F2\times\cos\theta)$, and the combined output F of the outputs Fx, Fy and Fz as $F=Fx+Fy-Fz$; and, when $\alpha_x$, $\alpha_y$, and $\alpha_z$ are detection sensitivity coefficients of the first, second, and third force sensors respectively, the detection sensitivity coefficient $\alpha_z$ of the third force sensor is $\alpha_z=(\alpha_x+\alpha_y)\times\tan\theta$, and the detected stress F1 is detected from the composite output F and outputted as $F1=F/\{(\alpha_x+\alpha_y)\cos\Phi\times\cos\theta-\alpha_z\times\sin\theta\}$.

The third aspect of the force sensor device with a multiple axis sensor that solves the above problem of the present invention comprises first and second force sensors that are arranged to form a predetermined angle Φ in mutually opposite directions with respect to the detected axis direction that run parallel to the sides of the device that form a rectangular shape; and a third force sensor that has a detection axis that is perpendicular to the plane formed by the detection axes of the first and second force sensors.

As the fourth aspect of the force sensor device with a multiple axis sensor that solves the above problem of the present invention, the predetermined Φ is 45°.

The fifth aspect of the force sensor device with a multiple axis sensor that solves the above problem of the present invention comprises a frame portion with outside edges of a rectangular shape; a weight that is disposed within the frame portion; and four flexible support bodies (called 'beams' below) that are arranged in orthogonal axis directions that pass through the center of the weight, the respective one end of which is connected to the weight and the respective other end of which is connected to the frame portion at an inclination that forms a 45° angle with the outside edge of the frame portion, wherein each of the four flexible beams comprises a detection element the physical quantity of which varies according to the flexibility of the beams when stress, because of the weight displacement induced from inertial force, is delivered to the weight.

The sixth aspect of the force sensor device with a multiple axis sensor that solves the above problem of the present invention is a force sensor device, wherein, according to the fifth aspect, the detection element the physical quantity of which varies comprises four piezoresistive elements, which are arranged in two mutually orthogonal axis directions that pass through the center of the weight and at the positions where the beams are connected to the frame portion and the weight; and the four piezoresistive elements are connected to a Wheatstone bridge.

The seventh aspect of the force sensor device with a multiple axis sensor that solves the above problem of the present invention is a force sensor device, further comprising, according to the fifth aspect, two sets of the four piezoresistive elements in either one of the two orthogonal axis directions, wherein the stress of the first axis direction is detected by means of the four piezoresistive elements of one of the two sets and the stress in a direction that is perpendicular to the two orthogonal axis directions is detected by the four piezoresistive elements of the other set.

The eighth aspect of the force sensor device with a multiple axis sensor that solves the above problem of the present invention is a force sensor device, further comprising, according to the seventh aspect, switch means that oppositely switch an arrangement in which two resistive elements of four piezoresistive elements arranged in either axis direction of two orthogonal axis directions are connected to the Wheatstone bridge, wherein the detection of stress in the first axis direction or the detection of stress in the perpendicular direction is rendered possible by means of the connection switching by the switch means.

The ninth aspect of the force sensor device with a multiple axis sensor that solves the above problem of the present invention is a force sensor device that detects stress delivered in a detected axis direction, comprising a frame portion with outside edges of a rectangular shape; a weight that is disposed within the frame portion; and four flexible beams that are arranged in orthogonal axis directions that pass through the center of the weight, the respective one end of which is connected to the weight and the respective other end of which is connected to the frame portion at an inclination that forms a 45° angle with the outside edge of the frame portion, wherein a first electrode portion is formed on the weight and on each of the four flexible beams, the force sensor device further comprising: an opposing electrode portion that is disposed to face the first electrode portion via an insulator, wherein the capacitance between the first electrode portion and the opposing electrode portion varies according to the flexibility of the beams when stress is delivered to the weight.

Further, an additional aspect of the force sensor device with a multiple sensor and the force detection method of the force sensor device is such that, according to the first aspect, the relationship of correspondence between the output Apz in the axis direction of the second force sensor and the angle θ is prestored; the force sensor device is kept in rest such that the first axis direction is in a horizontal direction; the corresponding angle θ is then found on the basis of the stored relationship of correspondence from the output of the second force sensor thus found; and the angle θ thus found is stored and the detection sensitivity coefficient of the corresponding second force sensor is found from the angle θ thus found.

An additional aspect of the force sensor device with a multiple sensor and the force detection method of the force sensor device is such that, according to the second aspect, the relationship of correspondence between an output Fz of the axis direction of the third force sensor and the angle θ is prestored; the force sensor device is kept in rest such that the plane formed by the detection axes of the first and second force sensors is placed in a horizontal direction; the corresponding angle θ is then found on the basis of the stored relationship of correspondence from the output of the third force sensor thus found; and the angle θ thus found is stored and the corresponding detection sensitivity coefficient of the third force sensor is found from the angle θ thus found.

Furthermore, an additional aspect of the force sensor device with a multiple sensor and the force detection method of the force sensor device is such that the storage of the angle θ thus found can be reset.

The characteristics of the present invention will become more evident from the embodiments that will be described hereinbelow with reference to the drawings.

According to the present invention, because the stress component perpendicular to the detection axis can be eliminated, when the sensor device according to the present invention is mounted on the device for detection, the sensor device can be used by means of only the input of the installation angle θ irrespective of the specific mount angle. Furthermore, the sensor device can also be constituted to sense the mount angle autonomously instead of the mount angle being inputted from the outside. Therefore, the sensor device to which the present invention is applied can be used generically.

BRIEF DESCRIPTION OF THE DRAWINGS

FIG. 4 illustrates combinations of applications of the present invention when the multiple axis sensor introduced by the 3-axis sensor development" 'Inventions' Journal, pages 52 to 63, September 2003; issued by the Invention society is used;

FIG. 5A illustrates the operating principles of a second embodiment of the present invention;

FIG. 5B illustrates the stress detection of a force sensor c;

DESCRIPTION OF THE PREFERRED EMBODIMENTS

The embodiments of the present invention will be described hereinbelow with reference to the drawings. Further, the embodiments described hereinbelow facilitate understanding of the present invention but the technological scope of the present invention is not limited to these embodiments.

Here, in order to understand the present invention correctly, the problems to be resolved that are illustrated in Japanese Patent Application Laid Open No. 2003-227844 will be described with reference to FIG. 1 prior to the description of the embodiments.

Suppose that the stress detection axis of a force sensor 1 is 1a, the detected axis direction is X, and an axis direction that is perpendicular to X is Z.

Figure 1A:
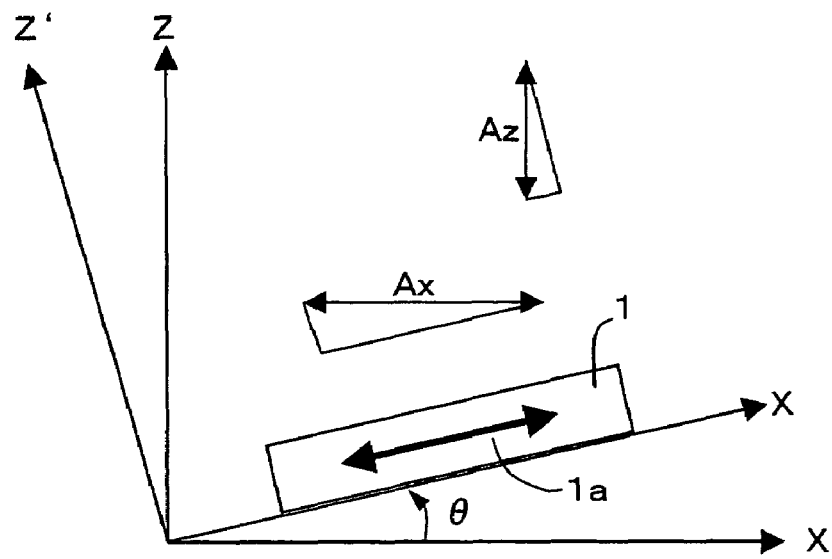
FIG. 1 illustrates the problems posed by the prior art that are to be resolved.

As shown in FIG. 1A, supposing that the angle that the stress detection axis 1a of the force sensor 1 forms with the detected axis direction X is θ, a detection output Apx of the force sensor 1 is then given by:

$$Apx = \alpha_x(Ax \times \cos\theta + Az \times \sin\theta) \quad \text{Equation (1)}$$

where Ax is the stress component delivered in the detection axis direction X, Az is the stress component delivered in the axis direction Z that is perpendicular to the detected axis direction X, and $\alpha_x$ is the detection sensitivity coefficient of the force sensor 1.

Figure 1B:
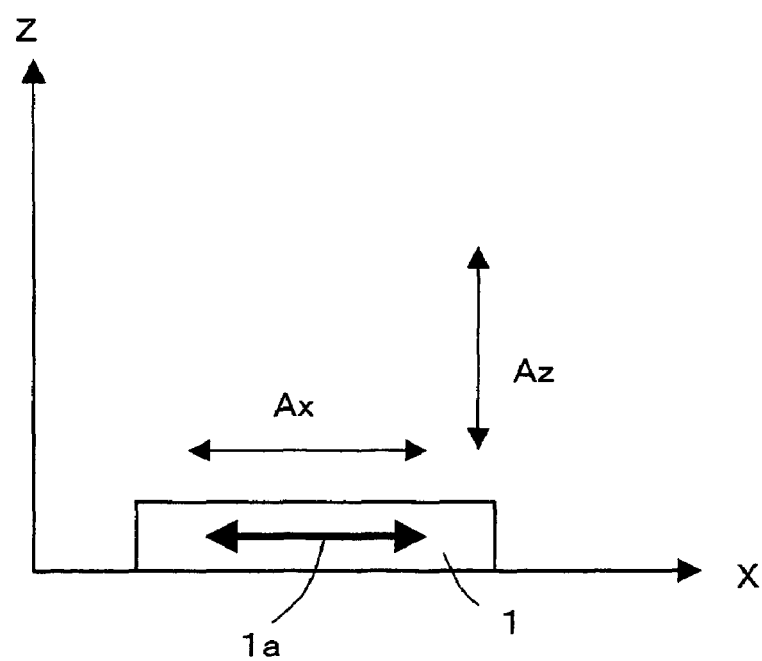

1) When the respective directions of the detection axis and stress match:

In this case, as shown in FIG. 1B, because the angle θ that the stress detection axis 1a forms with the detected axis direction X is 0°, only the stress component Ax in the X-axis direction is detected by means of Equation (1), and Az is not detected even when the stress component Az is delivered in the Z-axis direction. Therefore, the stress that is delivered in the detected axis direction X constituting the object can be detected correctly.

2) When the respective directions of the detection axis and stress do not match:

On the other hand, the output Apx of the force sensor 1 in a case where same is mounted tilted by θ with respect to the direction of the stress component that matches the X axis as shown in FIG. 1A is as per Equation (1). Therefore, $\alpha_x \times Az \times \sin\theta$ is detected as noise on the basis of the stress component Az in the Z-axis direction due to gravity, for example. That is, the component in the Z direction appears in the detection in the direction of the stress detection axis 1a of the force sensor 1.

Therefore, in order not to detect this Az component, in the case of the invention shown in Japanese Patent Application Laid Open No. 2003-227844, when a force sensor device is mounted on a substrate, the force sensor device must be tilted beforehand so that the detection axis of the force sensor device matches the direction in which the stress is delivered, as shown in 1) above.

Figure 2:
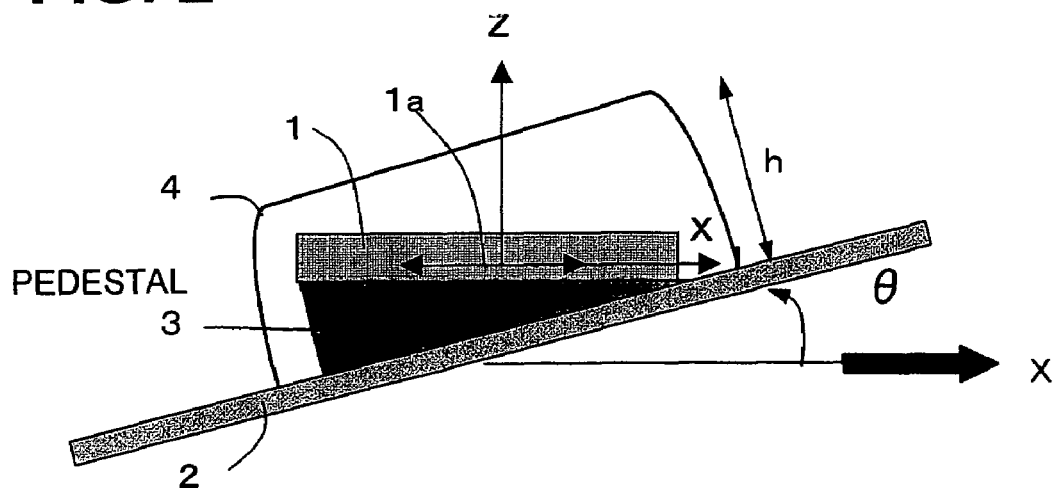
FIG. 2 is a cross-sectional conceptual view of the force sensor device 1 when substrate mounting is considered.

FIG. 2 is a cross-sectional conceptual view of the force sensor 1 in a case where this substrate mounting is considered. When the force sensor 1 is attached to the device to be measured, in cases where the substrate 2 on which the force sensor 1 is mounted is specified being attached at an angle θ, the substrate 2 forms an angle θ with the direction X of the stress to be detected.

Therefore, in a case where the force sensor 1 is mounted on the substrate 2 as is, the stress detection axis 1a of the force sensor 1 does not match the direction X of the stress. Therefore, as shown in FIG. 2, the force sensor 1 is constituted such that a pedestal 3 with angle θ is provided beneath the force sensor 1.

As a result, as shown in FIG. 1B, the stress detection axis 1a of the force sensor 1 matches the stress direction X. Therefore, the occurrence of noise can be prevented because only the stress component Ax in the X direction is detected and the stress component Az in the Z direction is not detected.

However, in this constitution, the pedestal 3, which corresponds with the angle θ that is specified for mounting to each measured device is required. In addition, the height h including a cover portion 4 that covers the force sensor 1 increases due to the existence of the pedestal 3 and this height increase does not comply with demands for miniaturization of the force sensor device. Therefore, the present invention represents a solution to this problem.

First Embodiment

Figure 3:
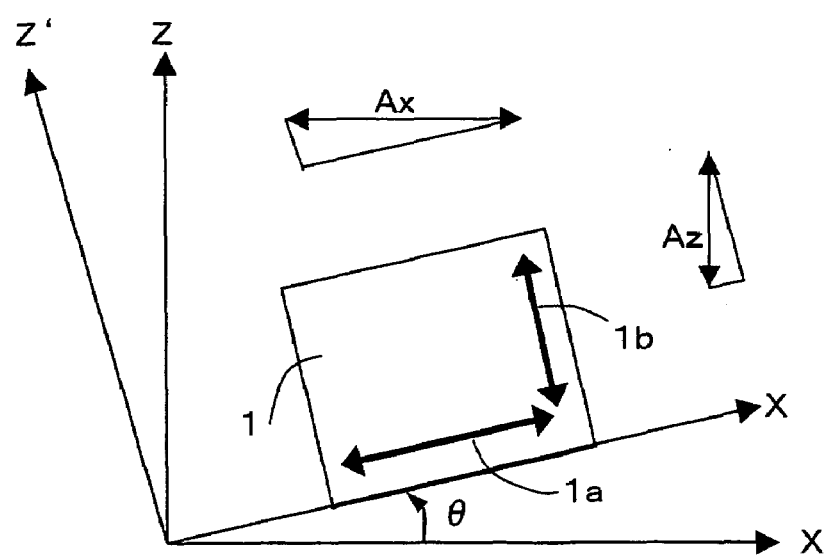
FIG. 3 illustrates the operating principles of a first embodiment of the present invention.

FIG. 3 illustrates the operating principles of the first embodiment of the present invention.

In the conventional example shown in FIG. 1, a force sensor that has only one detection axis is used in order to detect the stress in the detected axis direction of the object. In contrast, in the first embodiment according to the present invention, a 2-axis detection output is used.

As an embodiment example, in the example shown in FIG. 3, a 2-axis detection output, namely of an axis in a horizontal direction (X-axis) and an axis in a vertical direction (Z axis), is used.

That is, as shown in FIG. 3, the force sensor 1 has force sensors 1a and 1b for sensing stress components corresponding with the X-axis and Z-axis directions respectively. In a case where the force sensor 1 is mounted tilted by θ with respect to the detected axis X of the object, the stress component Apx sensed by the force sensor 1a and the stress component Apz sensed by the force-sensor 1b are produced with respect to stress A, which includes the X-axis direction component Ax and the Z-axis direction component Az.

That is, the detection output Apx of the force sensor 1a is then:

$$Apx = \alpha_x(Ax \times \cos\theta + Az \times \sin\theta) \quad \text{Equation (2)}$$

and the output Apz of the Z-axis direction force sensor 1b is then:

$$Apx = \alpha_z(Ax \times \sin\theta + Az \times \cos\theta) \quad \text{Equation (3)}$$

Here, the stress detection method of the present invention is characterized in that the relationship between $\alpha_x$ and $\alpha_z$, which are the detection sensitivity coefficients of the two force sensors 1a and 1b respectively prepared for stress detection in the detected axis X direction of the object, is established as:

$$\alpha_z = \alpha_x \tan \quad \text{Equation (4)}$$

Accordingly, the Az component can be eliminated from the stress component Apx in the detected axis direction thus sensed by the force sensor 1a.

That is, when the difference Apx−Apz between the outputs of the force sensors 1a and 1b is determined:

$$Apx-Apz=Ax(\alpha_x \times \cos\theta - \alpha_z \times \sin\theta) + Az(\alpha_x \times \sin\theta - \alpha_z \times \cos\theta) \quad \text{Equation (5)}$$

Because $\alpha_z = \alpha_x \tan\theta$ according to Equation (4), Equation (5) then becomes:

$$Apx-Apz=Ax(\alpha_x \times \cos\theta - \alpha_z \times \sin\theta) = Ax\alpha_x(\cos\theta - \tan\theta \times \sin\theta)$$

Therefore, the stress detection output Ax in the direction of the detected axis X thus found is:

$$Ax=Apx-Apz)/\alpha_x(\cos\theta - \tan\theta \times \sin\theta) \quad \text{Equation (6)}$$

and the Az component is eliminated.

For example, when the tilt angle $\theta=10°$, $$\alpha_z = 0.176 \times \alpha_x \quad \text{Equation (7)}$$

$$Ax=Apx-Apz)/0.954\alpha_x \quad \text{Equation (8),}$$

the detection output drops by about 5(%). However, stress detection in only the X-axis direction is possible by using two axis sensors in the X- and Z-axis directions and making the detection sensitivity in the Z-axis direction more appropriate.

Further, although the detection axes in the X-axis direction and Z-axis direction were considered in Equations (2) to (8), in cases where the detected axis direction is the Y-axis direction, it is easy to understand that the same is true for the detection axes in the Y-axis direction and Z-axis direction.

That is, FIG. 4 illustrates combinations of applications of the present invention when the multiple axis sensor introduced by the 3-axis sensor development" 'Inventions' Journal, pages 52 to 63, September 2003; issued by the Invention society, is used, for example. In FIG. 4, aspect I corresponds to the first embodiment above and represents a case where force sensors in the X-axis and Z-axis directions are used and the acceleration is sensed according to the stress in the X-axis direction. As the condition here, the condition for the sensitivity of each sensor is:

$$\alpha_z = \alpha_x \tan\theta.$$

Likewise, aspect II uses force sensors in the Y-axis and Z-axis directions and represents a case where the acceleration is sensed in accordance with the stress in the Y-axis direction. As the condition here, the condition for the sensitivity of each sensor is:

$$\alpha_z = \alpha_y \tan\theta.$$

Second Embodiment

Figure 5C:
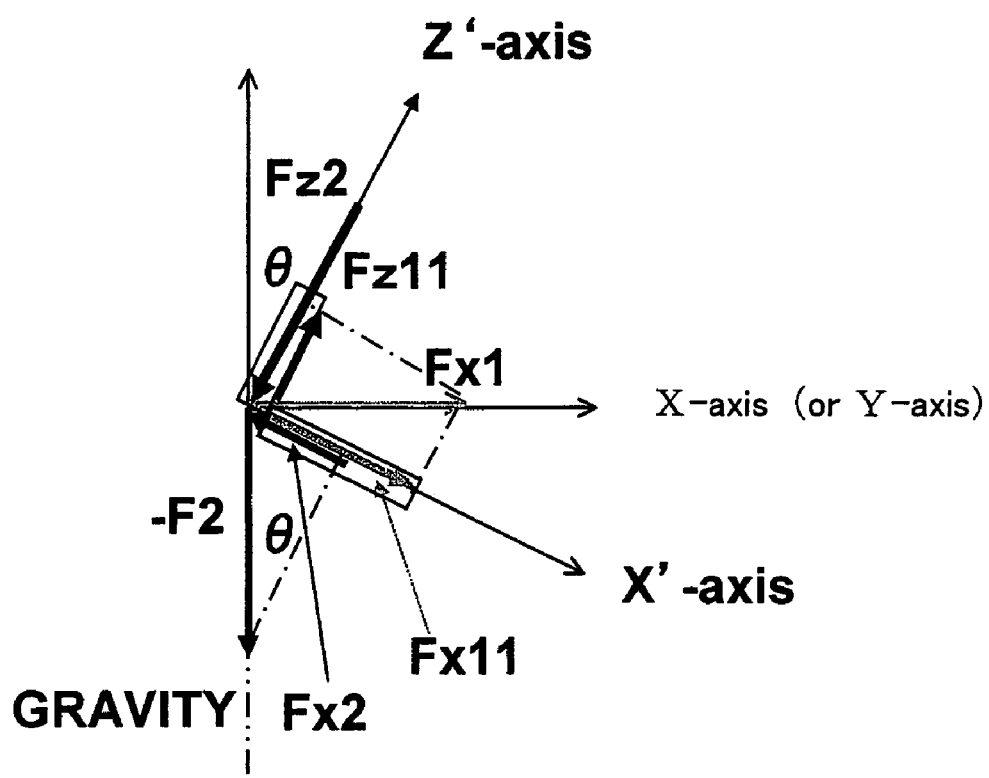
FIG. 5C shows the detection component of each force sensor with respect to stress F1 when the plane formed with the x and y axes is inclined by θ.

FIGS. 5A to 5C illustrate the operating principles of the second embodiment of the present invention. This embodiment detects the stress on the detected axis by using three force sensors.

FIG. 5A illustrates the stress component of the x and y axes, which are two axes in mutually opposite directions by angle Φ from the detected axis X when stress F1 is provided on the detected axis X (or Y axis, described as the X axis hereinbelow). Two force sensors a and b for detecting the stress component along the x and y axes are provided.

Stress components Fx1 and Fy1, which are detected by force sensors a and b respectively, are as follows.

$$Fx1=\alpha_x \times F1 \times \cos\Phi$$

$$Fy1=\alpha_y \times F1 \times \cos\Phi$$

The sensor further comprises a force sensor c, which senses the stress in the Z-axis direction as a third force sensor. FIG. 5B illustrates the stress detection of the force sensor c.

Gravity (F2) acts on the force sensor c as stress in the Z-axis direction. Therefore, the stress component Fz1, which is detected in the Z-axis direction by the force sensor c, is as follows.

$$Fz1=\alpha_z \times (-F2)$$

Here, FIG. 5C shows the detection component of each force sensor with respect to the stress F1 when the plane formed by the x and y axes is inclined by θ. As shown in FIG. 5C, when the plane formed by the x and y axes is inclined by θ, the detection components of each force sensor with respect to stress F1 is:

detection component of force sensor a: $Fx11=\alpha_x \times F1 \times \cos\Phi \times \cos\theta$ detection component of force sensor b: $Fy11=\alpha_y \times F1 \times \cos\Phi \times \cos\theta$ detection component of force sensor c: $Fz11=\alpha_z \times F1 \times \sin\theta$ In addition, the detection component of each sensor with respect to the stress (gravity) −F2 is:

detection component of force sensor a: $Fx2=\alpha_x \times (-F2 \times \sin\theta)$ detection component of force sensor b: $Fy2=\alpha_y \times (-F2 \times \sin\theta)$ detection component of force sensor c: $Fz2=\alpha_z \times (-F2 \times \cos\theta)$ $\alpha_x, \alpha_y, \alpha_z$ are detection sensitivity coefficients of the force sensors a, b, and c respectively.

Therefore, the detection output of each force sensor with respect to the stress F1 in the direction of the detected axis X and the stress received in the Z-axis direction due to gravity F2 is as follows:

detection output of the force sensor a:
$Fx=Fx11+Fx2=\alpha_x \times (F1 \times \cos\Phi \times \cos\theta - F2 \times \sin\theta)$ detection output of the force sensor b:
$Fy=Fy11+Fy2=\alpha_y \times (F1 \times \cos\Phi \times \cos\theta - F2 \times \sin\theta)$ detection output of the force sensor c:
$Fz=Fz11+Fz2=\alpha_z \times (F1 \times \sin\theta - F2 \times \cos\theta).$ Here, the composite output F in the direction of the detected axis X is found as follows from the detection outputs of the force sensors a, b, and c $$F=Fx+Fy-Fz=(\alpha_x+\alpha_y) \times (F1 \times \cos\Phi \times \cos\theta - F2 \times \sin\theta) - \alpha_z \times (F1 \times \sin\theta - F2 \times \cos\theta).$$

Therefore, the condition enabling the F2 component to be eliminated is:

$$F2 \times (\alpha_z \times \cos\theta - (\alpha_x+\alpha_y) \times \sin\theta)=0$$

That is, $\alpha_z = (\alpha_x + \alpha_y) \times \tan\theta$ Equation (9) is acceptable.

The stress F1 in the detected axis direction is:

$$F1=F/\{(\alpha_x+\alpha_y)\cos\Phi \times \cos\theta - \times\sin\theta\} \quad \text{Equation (10)}$$

As per Equation (10), also in the second embodiment, the detection output F can be based on the stress F1 alone.

The second embodiment, in which the force sensors a, b, and c of the three axes x, y, and Z are used to eliminate F2, corresponds to an embodiment rendered by substituting the X-axis force sensor or Y-axis force sensor of the earlier-described first embodiment, in which two axis sensors of the X and Z axes or the Y and Z axes are employed (see aspects I and II shown in the table of FIG. 4) for the force sensors a and b as two subsensors (see aspect III shown in the table of FIG. 4).

In addition, the stress detection output F1 with respect to the detected axis direction of the second embodiment that is determined in Equation (10) possesses the following characteristics in comparison with the case of the first embodiment.

As an example, supposing that $\Phi=45°$, $\alpha=\alpha_x=\alpha_y$, and $\theta=10°$, according to the second embodiment, $$F1 = F/\{(\alpha_x + \alpha_y) \times \cos\Phi \times \cos\theta - \alpha_z \times \sin\theta\}$$
$$= F/\{2\alpha(\sqrt{2}/2) \times \cos\Phi \times \cos\theta - 2\alpha \times \tan\theta \times \sin\theta\}$$
$$= (2Fx - Fz)/1.33\alpha$$

On the other hand, according to the first embodiment, which employs two axis sensors, from Equation (4):

$$\alpha = \alpha_x, \alpha_z = \alpha \times \tan\theta$$
$$F1 = (Apx - Apz)/(\alpha_x \times \cos\theta - \alpha_x \times \tan\theta \times \sin\theta)$$
$$= (Apx - Apz)/0.954\alpha$$

Therefore, because (2Fx>Apx, Fz=Apz), in a case where the second embodiment, which uses three axis sensors, is applied, the detection output can be considered to be larger than that of the first embodiment.

Embodiment examples will be described next, based on each of the above embodiments.

Embodiment Example 1

FIG. 6 is an explanatory view of an embodiment example in which the force sensor device to which the present invention is applied is constituted by a multiple-axis resistor-type force sensor chip.

Figure 6A:
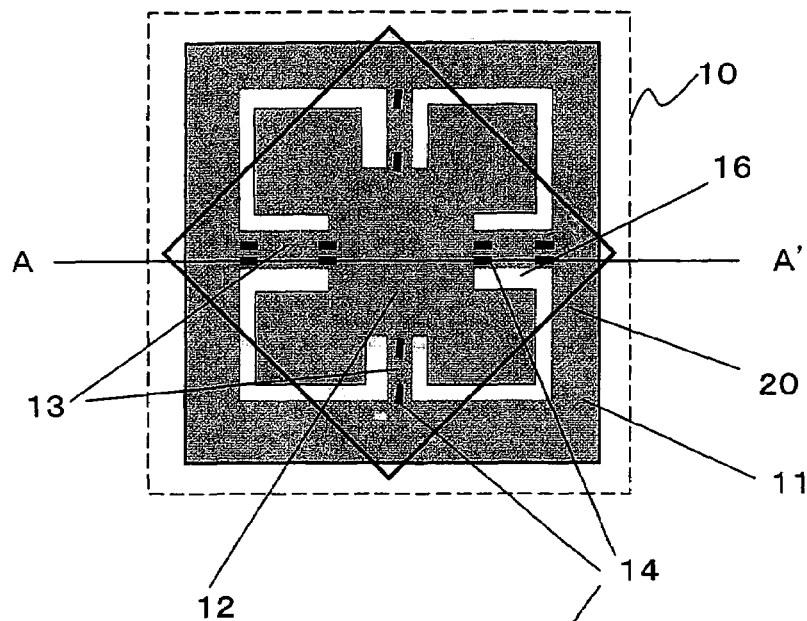
FIG. 6 illustrates an embodiment in which the force sensor device to which the present invention is applied is constituted with a multiple-axis resistor-type force sensor chip.
Figure 6B:
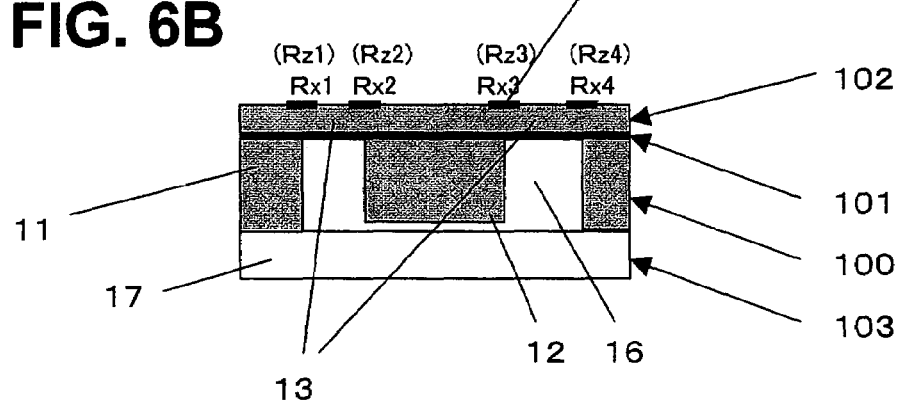

FIG. 6A is a top view of a fabricated sensor chip that is mounted in a package 10 of the force sensor device. FIG. 6B is a cross-sectional view along the line A-A'.

As the fabrication step, piezoresistive elements 14 and A1 wiring are first formed on the surface of an SOI substrate that is obtained by bonding the Si substrate 100, on which a thermal oxide film $SiO_2$ 101 is formed, to a second Si substrate 102 by means of anodic coupling as shown in FIG. 6A. FIG. 6A shows only the piezoresistors 14.

Next, region 16 is etched by subjecting the second Si layer 102 to Deep RIE or the like. In addition, etching is performed from the side of the first Si substrate 100. At this time, because the oxide film layer ($SiO_2$) 101 prevents etching of the second Si layer 102, region 16 is cut according to the patterned shape of the top view. Accordingly, a fixing frame portion 11, a weight portion 12, and beams 13, which link the fixing frame portion 11 and weight portion 12, are formed. In addition, a bottom face portion 103 is formed by bonding a Pyrex glass plate 17 to the fixing frame portion 11.

The piezoresistive elements 14 that are formed on the surface of the second Si layer 102 are arranged in the connection portions between the beam 13 and the fixing frame 1 and between the beam 13 and the weight portion 12, respectively, the beam 13 being positioned in orthogonal axis directions, with the weight portion 12 at the center.

As will be described subsequently, displacement of the weight portion 12 is produced as a result of stress in the horizontal direction and the beams 13 in orthogonal axis directions are displaced accordingly. Therefore, by detecting the change in the resistance value of the piezoresistive element 14, the size and direction of the stress can be sensed. Hence, two force sensors (1, 2) are obtained by means of the beams 13 in orthogonal directions on which the piezoresistive elements 14 are formed.

In addition, a resistance change is produced in the piezoresistive elements 14 with respect to the vertical stress on the weight portion 12 and, hence, a third force sensor, which senses the stress in a vertical direction, that is, in the Z-axis direction that lies perpendicular to the paper by sensing this change in resistance, is obtained.

In FIG. 6A, piezoresistors Rx1 to Rx4 and Rz1 to Rz4, which are arranged in parallel, are formed on the beams 13 in the horizontal direction (see FIG. 6B), and piezoresistors Ry1 to Ry4 are formed on the beams 13 in the vertical direction.

As will be described subsequently, the piezoresistors Rx1 to Rx4 are used for the stress component detection sensor of the X(x)-axis direction, the piezoresistors Rz1 to Rz4×4 are used for the stress component detection sensor of the Z-axis direction, and the piezoresistors Ry1 to Ry4 are used for the stress component detection sensor of the Y(y)-axis direction.

The constitution that includes the three force sensors above is the same as the constitution described in the "3-axis sensor development" 'Inventions' Journal, pages 52 to 63, September 2003; issued by the Invention society to which reference was made earlier. However, in the case of the invention that appears in "3-axis sensor development" 'Inventions' Journal, pages 52 to 63, September 2003; issued by the Invention society, sensors in three axis directions are used for the detection of stress in axes that individually correspond with each sensor.

In contrast, the present embodiment detects stress in one axis direction by using force sensors in two or three axes. That is, by using an X-axis direction or Y-axis direction force sensor and a third force sensor in the Z-axis direction among three force sensors in three axis directions, the force sensor device of the first embodiment can be implemented.

In addition, the force sensor device of the second embodiment can be implemented by mounting the multiple-axis resistor-type force sensor chip shown in FIG. 6A such that a direction forming a 45° angle with line A-A' matches the direction of the detected axis X of the stress and by using two force sensors in the x and y axis directions of two axes that lie orthogonal to one other in a horizontal direction to the paper, and a force sensor that senses the stress in the Z-axis direction that is perpendicular to the paper. In this case, the angle $\Phi$ is 45° in the second embodiment.

Figure 7:
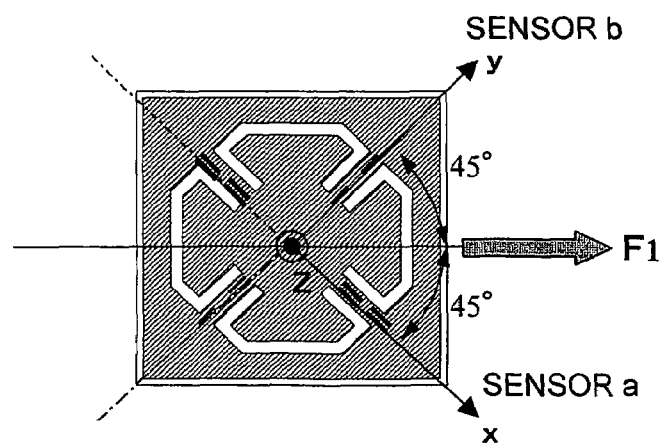
FIG. 7 illustrates a constitutional example that implements package miniaturization in cases where the second embodiment is constituted as a force sensor device.

FIG. 7 illustrates a constitutional example that implements package miniaturization in a case where the second embodiment is constituted as a force sensor device. FIG. 6A shows the upper plane of the sensor chip that has been formed by cutting along the frame line 20. The constitution is characterized in that the size of the package can be reduced in comparison with the package 10 shown in FIG. 6A in keeping with the demand for miniaturization.

In FIG. 7, two first and second force sensors a and b respectively, which sense the stress components in the directions of the two horizontal axes x and y with respect to the stress F1 in the X-axis direction shown in FIG. 5A, and a third force sensor, which senses the stress in a direction that is perpendicular to the paper (Z-axis direction), are obtained.

Therefore, the earlier-described second embodiment, which detects the stress F1, can be constituted by using the two first and second force sensors a and b respectively, and a third force sensor.

FIG. 8 illustrates the changes in the piezo resistor corresponding with the stress of the stress sensor in the three axis directions of FIGS. 6 and 7.

Figure 8A:
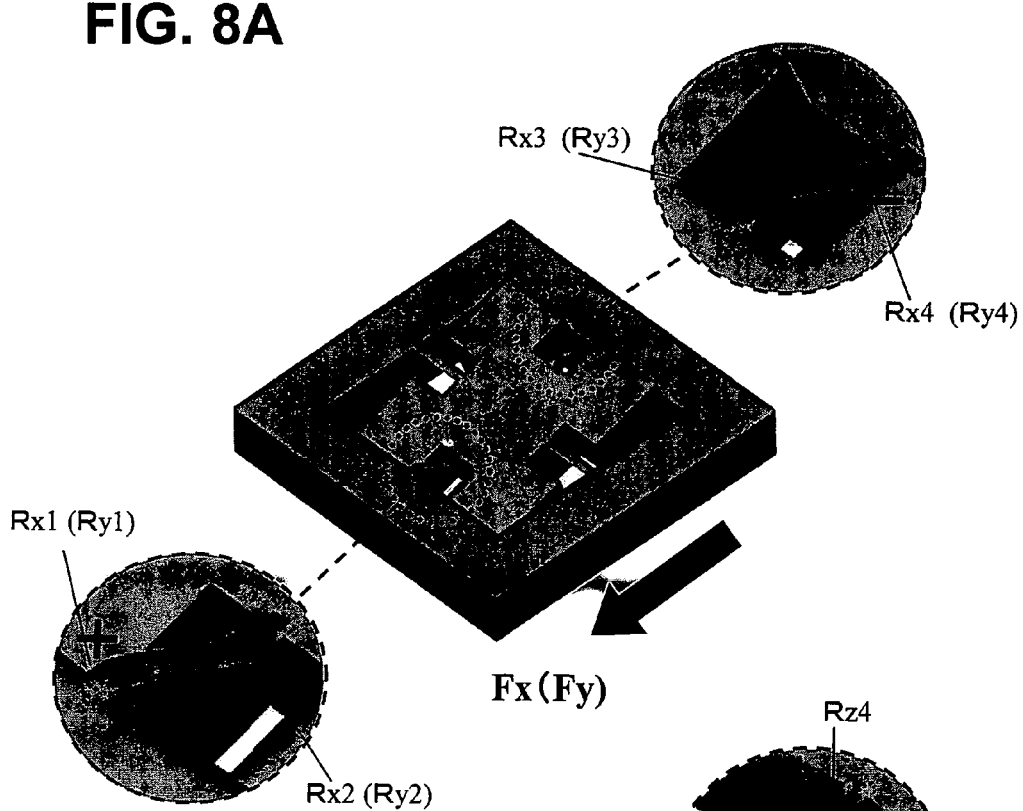
FIG. 8 illustrates the change in the piezoresistance corresponding with the stress on the stress sensors in three axis directions in FIGS. 6 and 7.

FIG. 8A illustrates the change in the piezo resistor when stress is delivered in a horizontal direction along the X(Y) axis. As a result of the stress in the direction of the X(Y) axis, the extension of the piezo resistors Rx1 and Rx3 increases the resistance value and compression of the piezo resistors Rx2 and Rx4 reduces the resistance value.

Figure 8B:
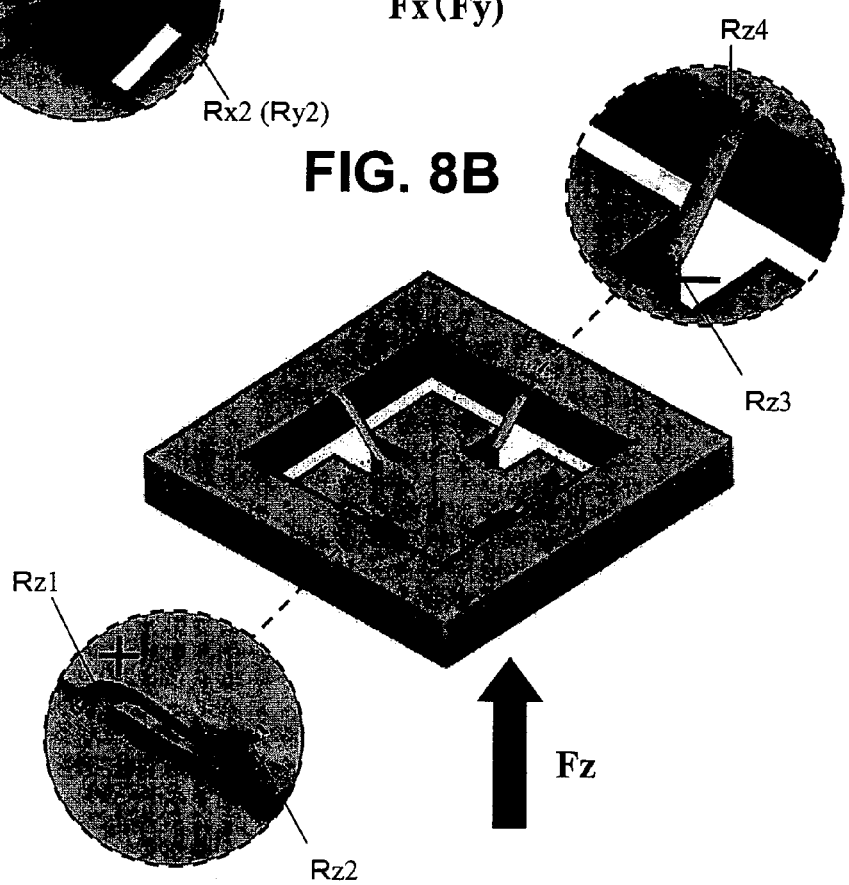

FIG. 8B illustrates the change in the piezo resistor when stress is delivered in the vertical direction along the Z axis. As a result of stress in the upward direction along the Z axis, the weight portion 12 drops and, accordingly, the extension of the piezoresistors Rz1 and Rz4 increases the resistance value, while compression of the piezo resistors Rz2 and Rz3 reduces the resistance value.

By judging the combination of these changes in the resistance value, the direction and size of the stress are obtained.

Figure 9:
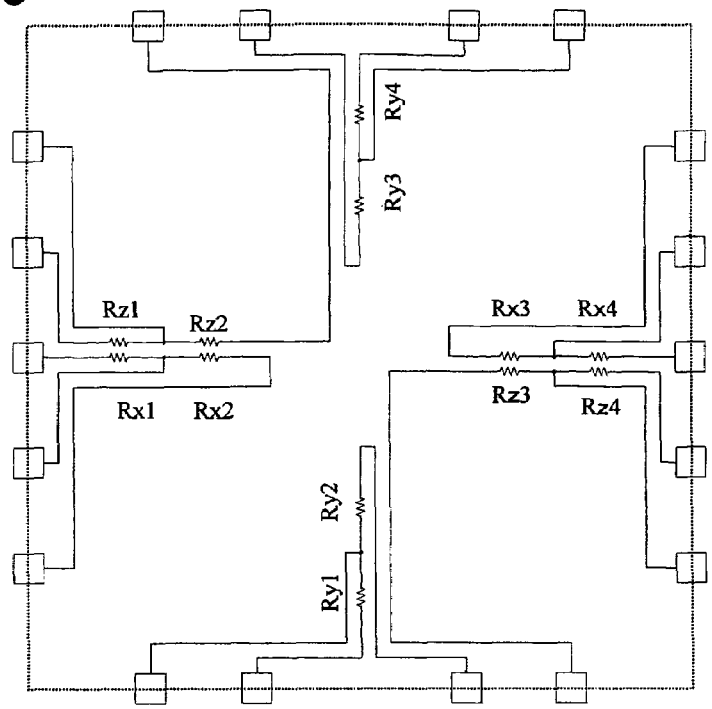
FIG. 9 is an example of a connection of piezoresistors that are formed on beams 13 of the sensor chip shown in the cross-sectional view of FIG. 6B.
Figure 10A:
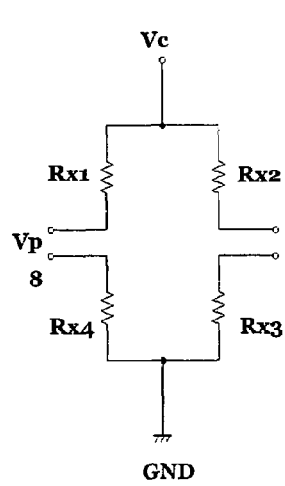
FIG. 10 shows Wheatstone-bridge connections that correspond with the force sensors a, b and c.
Figure 10B:
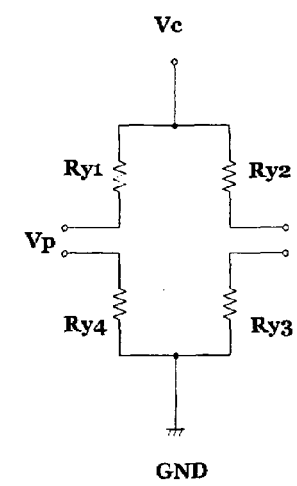
Figure 10C:
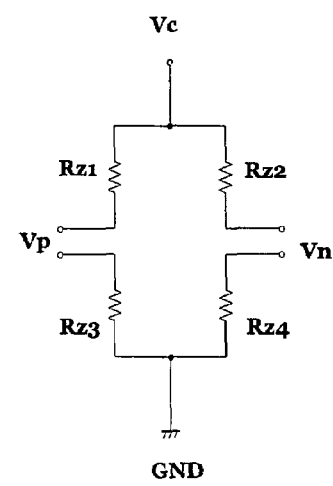

FIG. 9 is an example in which the piezo resistors formed on the beams 13 of the sensor chip shown in the cross-sectional view of FIG. 6B are connected. These connections also correspond to the force sensors a, b, and c as shown in FIG. 10, which are connected to the Wheatstone bridges shown in FIGS. 10A, 10B, and 10C respectively.

Here, the output voltage Vout of the bridge resistors is given as:

$$Vout = \{R4/(R1+R4) - R3/(R2+R3)\}Vc \quad \text{Equation (11)}$$

Therefore, when the stress is delivered as per FIGS. 8A and 8B, the bridge resistors of FIGS. 10A, 10B, and 10C respectively correspond with the force sensors in the X-axis direction, Y-axis direction, and Z-axis direction, and therefore the voltage between Vp and Vn is then the output voltage Vout and is as follows:

X-axis direction sensor output:

$$Voutx = \left( \frac{Rx4 - \Delta Rx4}{(Rx1 + \Delta Rx1) + (Rx4 - \Delta Rx4)} - \frac{Rx3 + \Delta Rx3}{(Rx2 - \Delta Rx2) + (Rx3 + \Delta Rx3)} \right) Vc \quad \text{Equation (12)}$$

Y-axis direction sensor output:

$$Vouty = \left( \frac{Ry4 - \Delta Ry4}{(Ry1 + \Delta Ry1) + (Ry4 - \Delta Ry4)} - \frac{Ry3 + \Delta Ry3}{(Ry2 - \Delta Ry2) + (Ry3 + \Delta Ry3)} \right) Vc \quad \text{Equation (13)}$$

Z-axis direction sensor output:

$$Voutz = \left( \frac{Rz3 - \Delta Rz3}{(Rz1 + \Delta Rz1) + (Rz3 - \Delta Rz3)} - \frac{Rz4 + \Delta Rz4}{(Rz2 - \Delta Rz2) + (Rz4 - \Delta Rz4)} \right) Vc \quad \text{Equation (14)}$$

Figure 11:
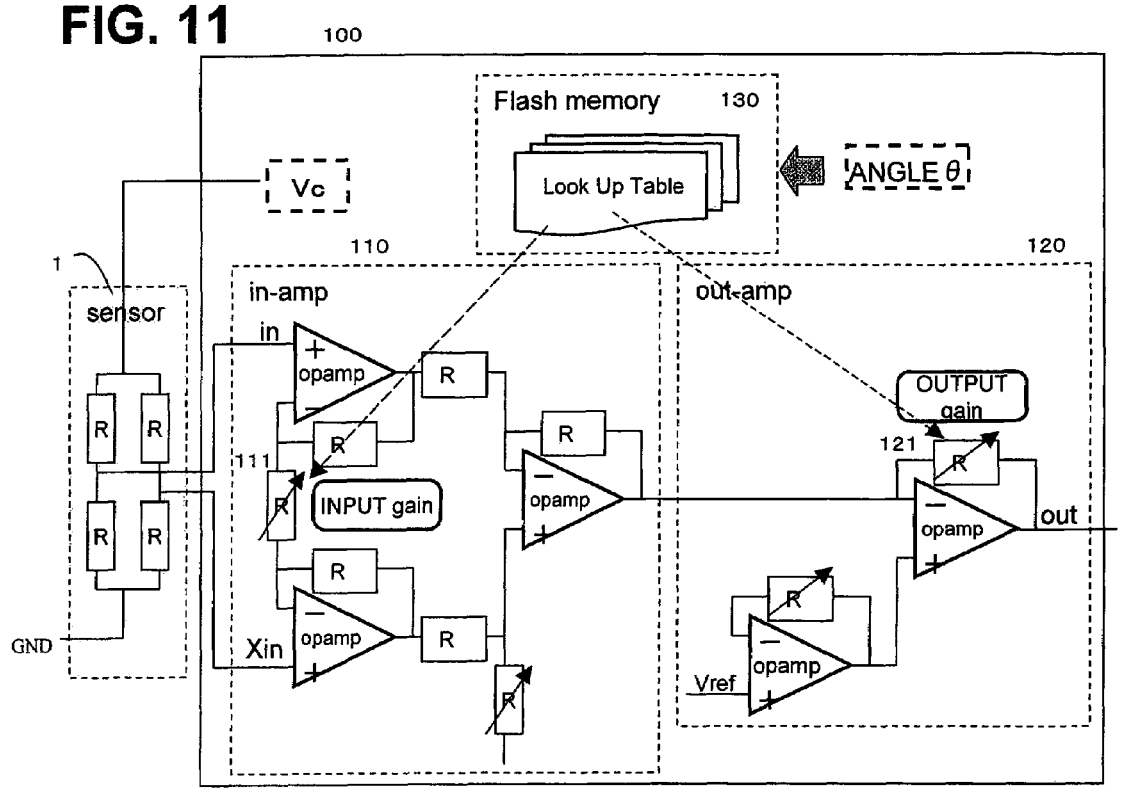
FIG. 11 illustrates the constitution of the output circuit block 100.

The detection voltages of the respective sensors are, as an embodiment example, outputted via the output circuit block 100 shown in FIG. 11.

FIG. 11 shows only the constitution of the output circuit block 100 of one force sensor 1 because this constitution is common to the three force sensors.

The output circuit block 100 comprises a lookup table 130 in addition to an input amplifier unit 110 and output amplifier unit 120.

The Wheatstone-bridge output voltages Vp and Vn shown in FIG. 10 are outputted-by the input amplifier unit 110 and then amplified and outputted by the output amplifier 121.

The lookup table 130 stores the tuning value of the amplifier-input gain tuning resistor 111 and the output gain tuning resistor 121 in order to obtain the force-sensor detection sensitivity coefficient α corresponding with each of the plurality of tilt angles θ with respect to the detected axis direction when the force sensor device is installed.

The relationship of correspondence between the tilt angle θ and the force-sensor detection sensitivity coefficient α is $\alpha_z = \alpha_x \tan \theta$ in the first embodiment (see Equation (4)). Further, in the second embodiment, $\alpha_z = (\alpha_x + \alpha_y) \times \tan \theta$ (see Equation (9)).

Therefore, a predetermined amplification gain is obtained by tuning the input gain tuning resistor 111 and the output gain tuning resistor 121 by means of tuning values that are read by accessing the lookup table 130 by means, of the tilt angle θ.

For the output of the output amplifier unit 120, the stress is sought in the detected axis direction that is determined by calculating Equation (6) above in a case where the first embodiment is implemented for the circuit (not shown) and Equation (10) above in a case where the second embodiment is implemented.

Here, in Equations (12), (13), and (14), $$\Delta Rx1 \approx \Delta Rx2 \approx \Delta Rx3 \approx \Delta Rx4$$

$$\Delta Ry1 \approx \Delta Ry2 \approx \Delta Ry3 \approx \Delta Ry4$$

$$\Delta Rz1 \approx \Delta Rz2 \approx \Delta Rz3 \approx \Delta Rz4$$

Here, in Equations (12), (13), and (14), Equations (12), (13), and (14) are then Equations (15), (16), and (17) below.

$$Voutx = \left( \frac{Rx4 - \Delta Rx4}{Rx1 + Rx4} - \frac{Rx3 + \Delta Rx3}{Rx2 + Rx3} \right) Vc \quad \text{Equation (15)}$$

$$Vouty = \left( \frac{Ry4 - \Delta Ry4}{Ry1 + Ry4} - \frac{Ry3 + \Delta Ry3}{Ry2 + Ry3} \right) Vc \quad \text{Equation (16)}$$

$$Voutz = \left( \frac{Rz3 - \Delta Rz3}{Rz1 + Rz3} - \frac{Rz4 + \Delta Rz4}{Rz2 + Rz4} \right) Vc \quad \text{Equation (17)}$$

As can be seen from Equations (15) to (17), Equation (17) is obtained by substituting only R3 and R4 of Equation (15) or (16).

Figure 12:
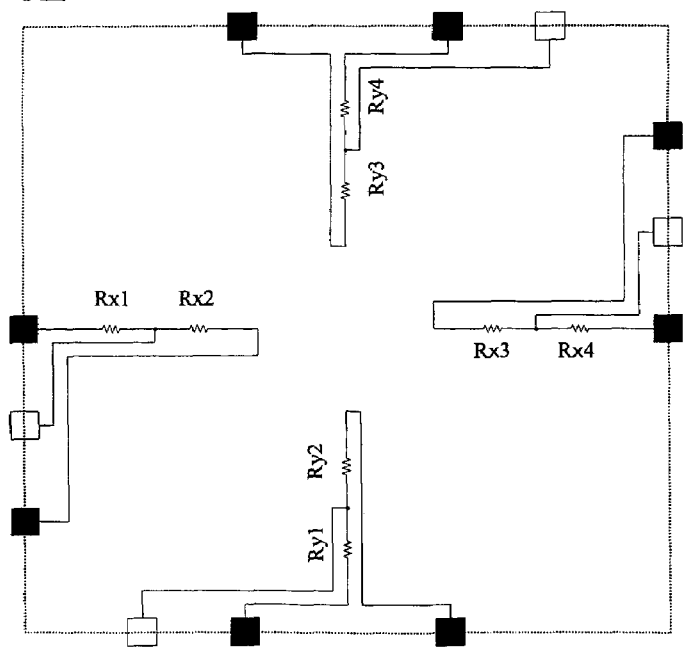
FIG. 12 illustrates a piezo-resistor connection example in which a Z-axis sensor piezoresistive element is used commonly with an X-axis sensor or Y-axis sensor piezoresistive element.

Therefore, as shown in FIG. 12, only the resistors Rx1 to Rx4 and Ry1 to Ry4 are formed for use by the X-axis and Y-axis sensors respectively on the orthogonal beams 13 in FIG. 9. Further, in the output circuit block 100, the connection between resistors Rx3 and Rx4 or resistors Ry3 and Ry4 is switched using time division from that in FIG. 10A or FIG. 10B to the connection in FIG. 10C, and hence the Z-axis sensor piezoresistive elements can be commonly used with the X-axis sensor piezoresistive element or Y-axis sensor piezoresistive elements.

This constitution makes it possible to balance the orthogonally formed piezoresistive elements and connection wiring. As a result, an improvement in the detection characteristics can be expected.

That is, by forming the piezo resistors and wiring on orthogonal beams as shown in FIG. 12, the stress on the beams is made uniform, and hence an offset reduction and flattening of the temperature characteristic are feasible.

FIG. 13 also illustrates another formation example of the piezo resistor when uniformity of the beam stress is considered.

Figure 13A:
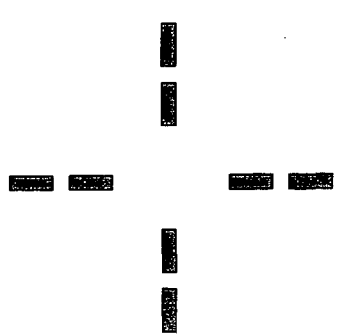
FIG. 13 illustrates another piezo-resistor formation example when uniformity of the beam stress is considered.
Figure 13B:
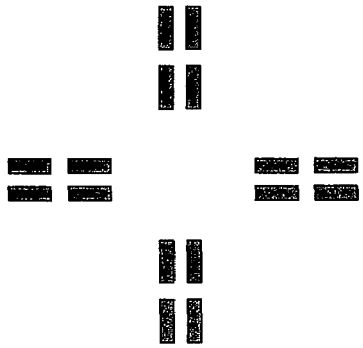

FIG. 13A is an example that corresponds with FIG. 12 described earlier and represents a constitution in which four resistors and wiring, which is omitted from FIG. 13, are formed on orthogonal beams. In contrast, FIG. 13B is another formation example and is an example in which resistors equivalent to the resistors Rz1 to Rz4, which are used for detection in the Z-axis direction in FIG. 9, are formed on both orthogonal beams together with the corresponding wiring. Beam stress is also made uniform in the case of this embodiment. In addition, in the example of FIG. 13B, the X- and Y-axis stress detection and Z-axis stress detection need not be switched by means of time division and the processing is the same as that of the earlier-described FIG. 9.

Figure 14:
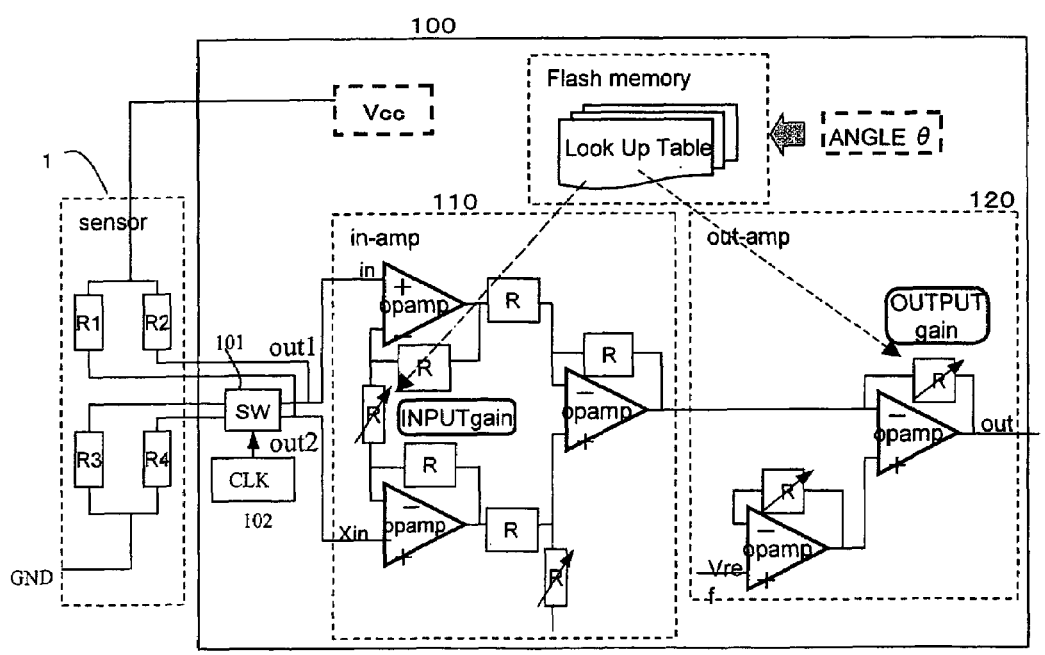
FIG. 14 is a constitutional example of an output circuit block 100 that corresponds with the embodiment example shown in FIG. 12.

FIG. 14 is a constitution example of the output circuit block 100 that corresponds with the embodiment example shown in FIG. 12. The basic constitution is the same as the constitution of FIG. 11, and hence another detailed description will be omitted here. The difference is that this is a constitution in which the detected voltage is inputted to the input amplifier unit 110 via the switch circuit 101 that switches the connection between the piezoresistive elements R3 and R4 of the force sensor 1 by means of time division.

As per the reference made earlier, the connections of the piezoresistive elements R1 to R4 of the force sensor 1 are switched so that the connections of the R3 and R4 are then reversed. That is, the detection output of the force sensor 1 is inputted to the input amplifier 110 by switching the connection format used for the X-axis or Y-axis detection (FIG. 10A or 10B) and the connection format used for the Z-axis stress detection (FIG. 10C) by means of the switching circuit 101 in accordance with the time-division timing of the clock 102.

Figure 15A:
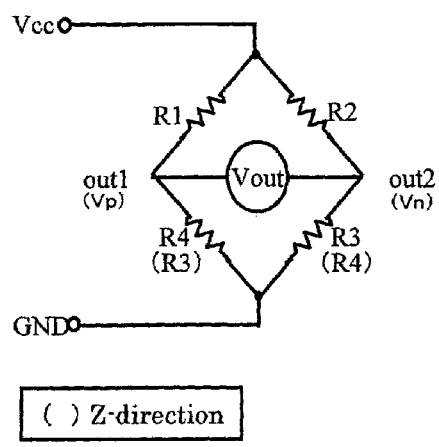
FIG. 15 illustrates the operation of a switch circuit 101.

FIG. 15 illustrates the operation of the switch circuit 101 in more detail. The resistors R1 and R4, and R2 and R3 of the bridge connections (see FIG. 10A or 10B) in FIG. 15A are disconnected and the side on which the resistors R4 and R3 are disconnected is connected to the switch circuit 101.

Figure 15B:
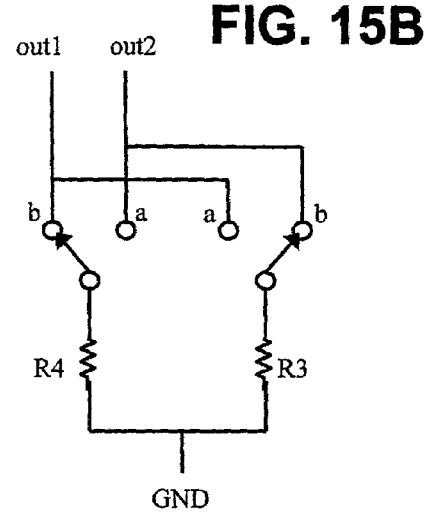

The switch circuit 101 has the constitution of FIG. 15B, and therefore, when the switch is on the b side, X-axis detection is executed, and, when the switch is on the a side, Z-axis detection is executed. The supply of a switching clock 102 that is supplied to the switch circuit 101 is controlled from the outside and the output of the output amplifier unit 120 is read as an X-axis output when the switch is on the b side and as a Z-axis output when the switch is on the a side.

Here, when the switch circuit 101 is switched for a DC current, measurement is simple. However, by performing a switching operation by means of a high-speed switching clock 102 and reading the output in sync, the simultaneous measurement of stress in the X and Z-axes can be implemented.

Although an example of a force sensor device that uses piezoresistive elements and senses a change in stress by means of the change in the resistance values thereof has been described thus far, application of the present invention is not limited to such an example. FIG. 16 is another constitutional example of the sensor device according to the present invention in which a change in capacitance is sensed instead of a change in resistance.

Figure 16A:
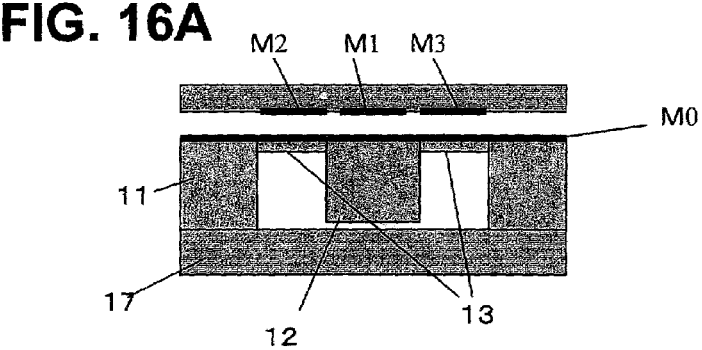
FIG. 16 shows another constitutional example of the sensor device according to the present invention.
Figure 16B:
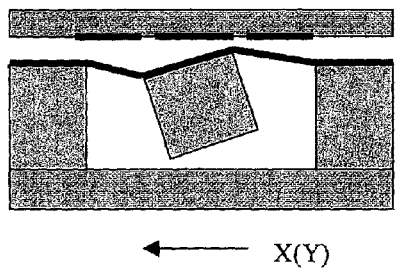
Figure 16C:
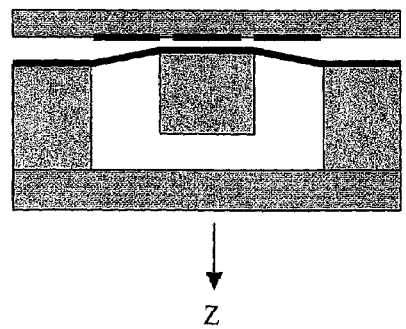

That is, as the cross-sectional constitution shown in FIG. 16A shows, an electrode plate M0 that is common to the weight portion 12 and the beams 13 is formed and the electrode plates M1, M2 and M3 are arranged on the fixing plate portion 30 that lies opposite the electrode plate M0, whereby individual capacitance values are obtained. As shown in FIGS. 16B and 16C, the capacitance between the opposing electrode plates fluctuates as a result of displacement of the weight portion 12. Therefore, by sensing these changes in capacitance by means of a Wheatstone-bridge constitution as shown in FIG. 10, it is possible to sense the size and direction of the stress.

Further, a constitution that senses, as change in a physical quantity with respect to the stress on the beams 13, magnetic changes and so forth rather than the above-mentioned changes in resistance and capacitance is also feasible as another method.

Figure 17A:
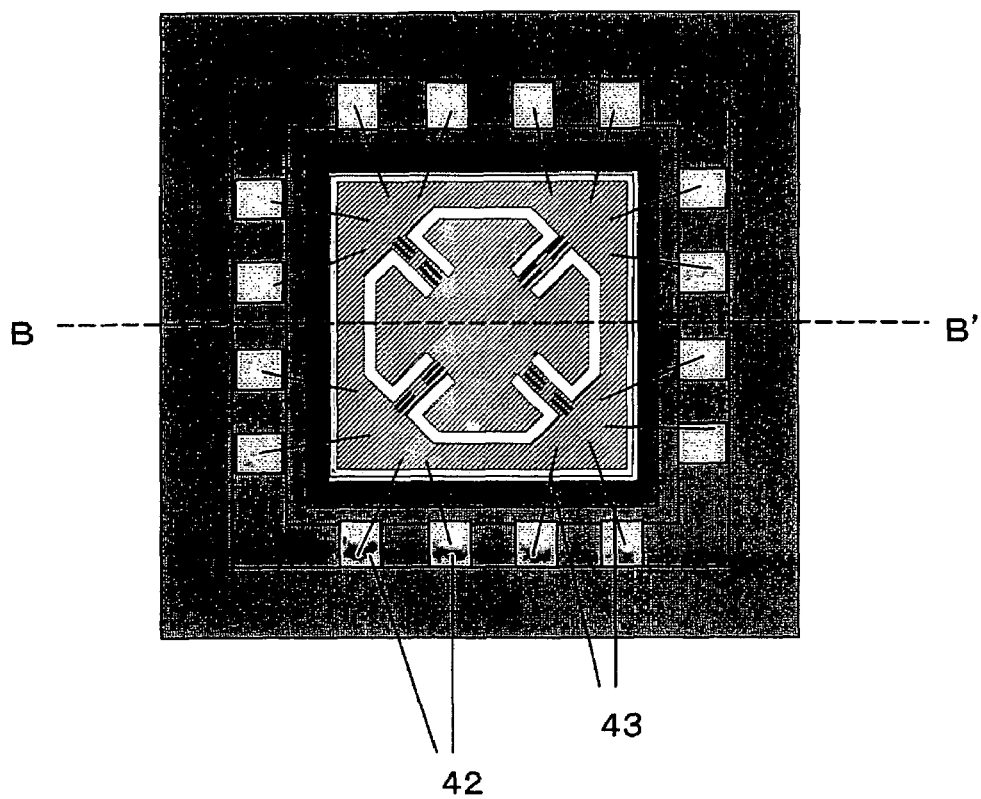
FIG. 17 illustrates an embodiment example of a package structure of the sensor device that is common to each of the embodiments.
Figure 17B:
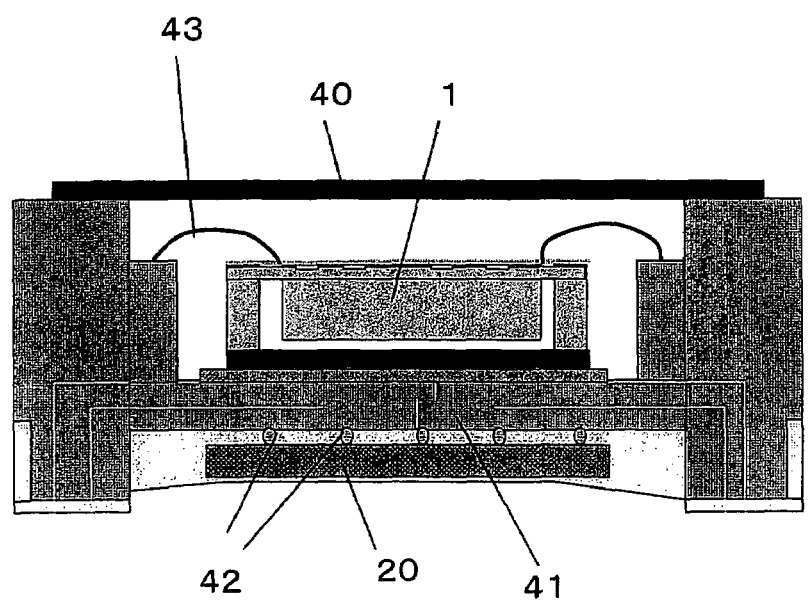

FIG. 17 illustrates an embodiment example of a package structure of the sensor device that is common to each of the embodiments above. FIG. 17A is an upper view excluding a lid 40, and FIG. 17B is a cross-sectional view along the line B-B' in FIG. 17A.

As shown in FIG. 17B, the present invention is characterized in that the region in which the sensor chip 1 is installed and the region in which the control chip 20 on which the output circuit block 100 shown in FIG. 11 is mounted is installed are mounted on two upper and lower levels by means of a wiring substrate 41. The sensor chip 1 is connected with peripheral electrode terminals 42 and bonding wire 43 and the control chip 20 is connected to the wiring substrate 41 by means of a flip chip 42.

Further, as can be seen in the top view of FIG. 17A, in the embodiment example, an example is illustrated in which the piezoresistive elements formed on the orthogonal beams of the sensor chip 1 have wiring corresponding with resistors equivalent to the resistors Rz1 to Rz4 for detection in the Z-axis direction shown in FIG. 13B formed on both the orthogonal beams of the sensor chip 1.

Here, only the functions of the output circuit block 100 are built into the control chip 20 and the detection output of each force sensor is guided to an externally located processing circuit (not shown). The externally located processing circuit performs calculation processing of Equation (6) in the first embodiment, and the calculation processing of Equation (10) in the second embodiment. Alternatively, the control chip 20 may be constituted comprising a function circuit that performs calculations with Equation (6) or (10) on the basis of the output of the output circuit block 100.

Figure 18:
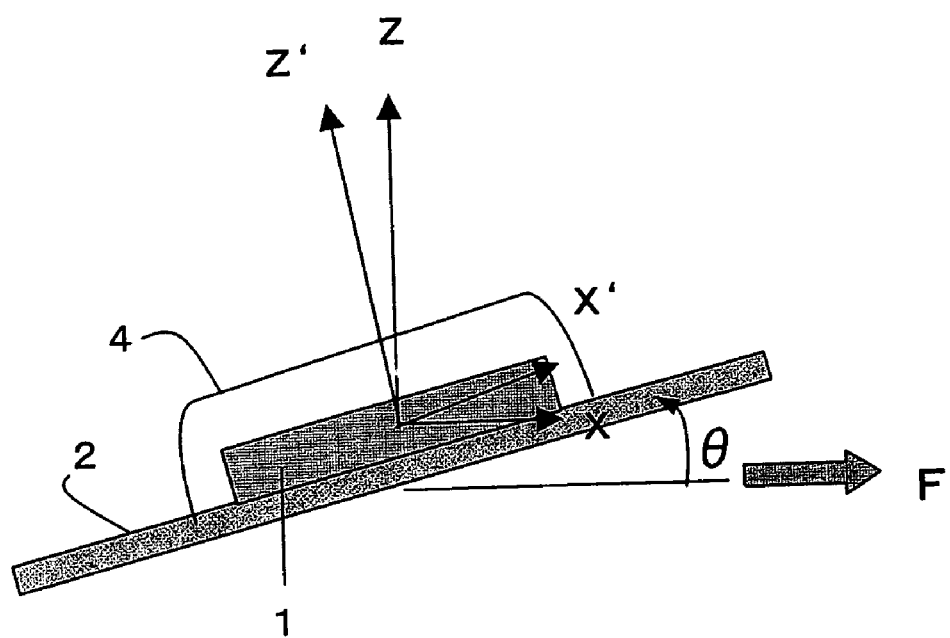
FIG. 18 illustrates the effect of the force sensor device according to the present invention.

FIG. 18 illustrates the effects of the force sensor device according to the present invention above. Even in a case where the sensor device is mounted at tilt angle θ with respect to the direction A in which the stress is delivered, the component in the Z-axis direction is eliminated by the present invention as described earlier. Therefore, there is no need to install the pedestal 3 below the sensor chip 1 in order to remove the Z-axis direction component as was the case conventionally, meaning that the force sensor device can be miniaturized.

In addition, as described in FIG. 11, the amplifier gain for obtaining the detection sensitivity coefficients (Equations (4) and (9)) constituting the corresponding conditions can be tuned by inputting tilt angle data in accordance with the tilt angle θ at which the sensor device is mounted. As a result, the appearance of the Z-axis direction component as noise in the detection output can be prevented. Accordingly, mounting is not limited to the tilt angle θ at which the sensor device is mounted, and hence the person-hours involved in the mounting work can be reduced considerably.

Here, in the description of the embodiment in FIG. 11 above, a process was described in which the input gain tuning resistor 111 of the input amplifier unit 110 and the output gain tuning resistor 121 of the output amplifier unit 120 are tuned with obtaining force-sensor detection sensitivity coefficient α by accessing the lookup table 130 on the basis of the tilt angle θ when the force sensor device according to the present invention is attached to a practical device such as a car navigation device.

When the force sensor device is mounted in a practical device, the tilt angle θ can be inputted as a mount angle that has been established beforehand in an assembly process.

On the other hand, the constitution can be such that the tilt angle θ in a state where the force sensor device according to the present invention is mounted is found autonomously and then used to reference the lookup table 130. In such a case, the inputting of the tilt angle 6 at the time of the mounting step is unnecessary and hence increased efficiency is achieved in the work of mounting the force sensor device in the practical device.

Figure 19:
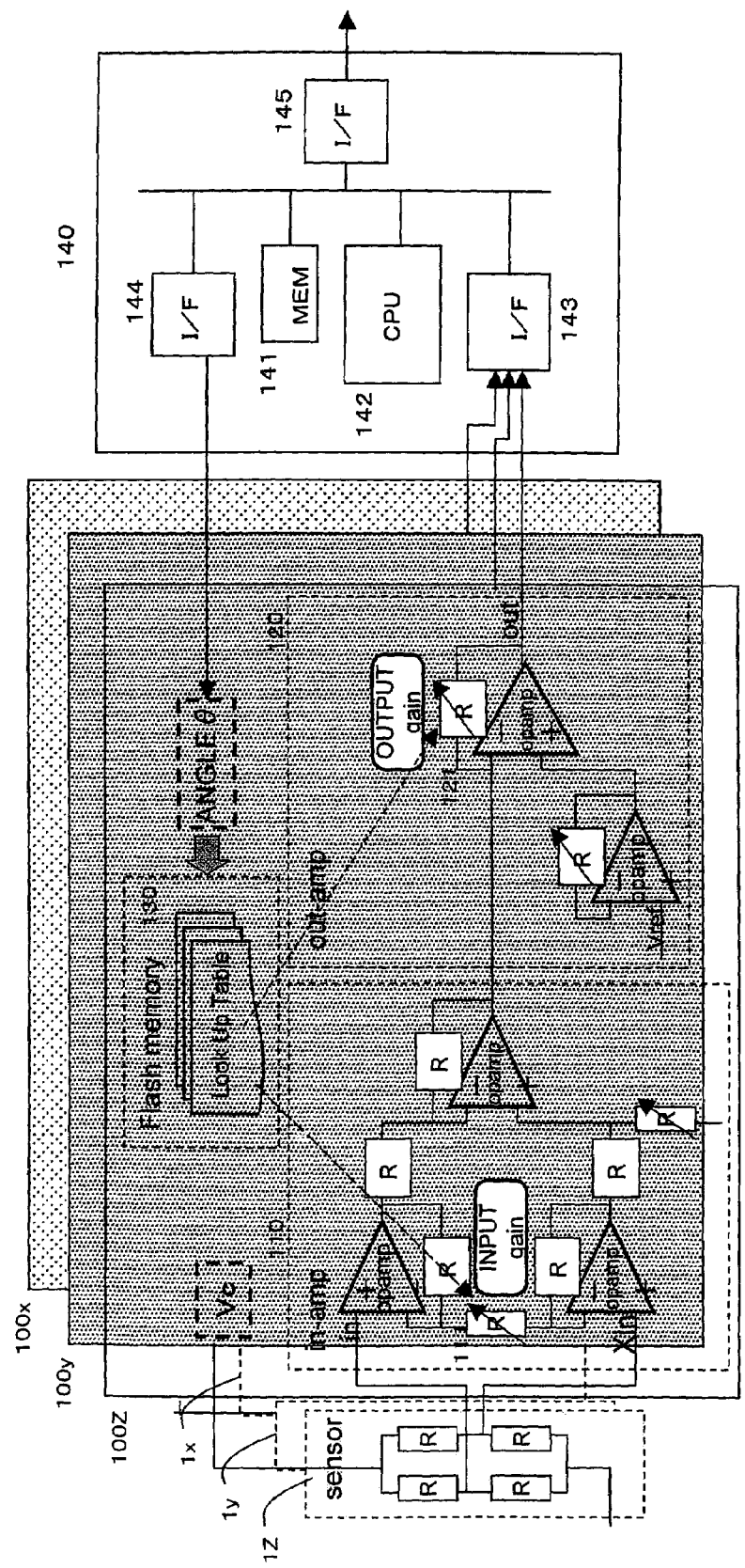
FIG. 19 is a block diagram of the constitution of an embodiment in which the tilt angle θ is found autonomously.

FIG. 19 is a block diagram of the constitution of an embodiment example in which this tilt angle θ is found autonomously. FIG. 19 comprises a processing unit 140 that is provided as part of the output circuit block 100 of the force sensor device or independently from the force sensor device.

In a case corresponding to the second embodiment, the constitution comprises three output circuit blocks 100x, 100y, and 100Z for the sensors 1x, 1y, and 1Z in the x, y, Z-axis directions, which correspond to the detection of the stress components in the x, y, and Z-axis directions respectively.

In a case corresponding to the first embodiment, only two output circuit blocks may be provided in correspondence with the x and y axes.

In FIG. 19, each of the output circuit blocks 100x, 100y, and 100Z has the function operation described in FIG. 11. The processing unit 140 has the outputs of the output circuit blocks inputted thereto via an interface 143 and, on this basis, calculates the stress detection output Ax in the detected axis direction in accordance with Equation (6) in the first embodiment or calculates, in the second embodiment, the stress F1 in the detected axis direction in accordance with Equation (10) by means of a CPU 142, and outputs the stress detection output Ax or stress F1 via an interface 145. The force sensor device is used according to the objective of the device in which the force sensor device is mounted.

Figure 20:
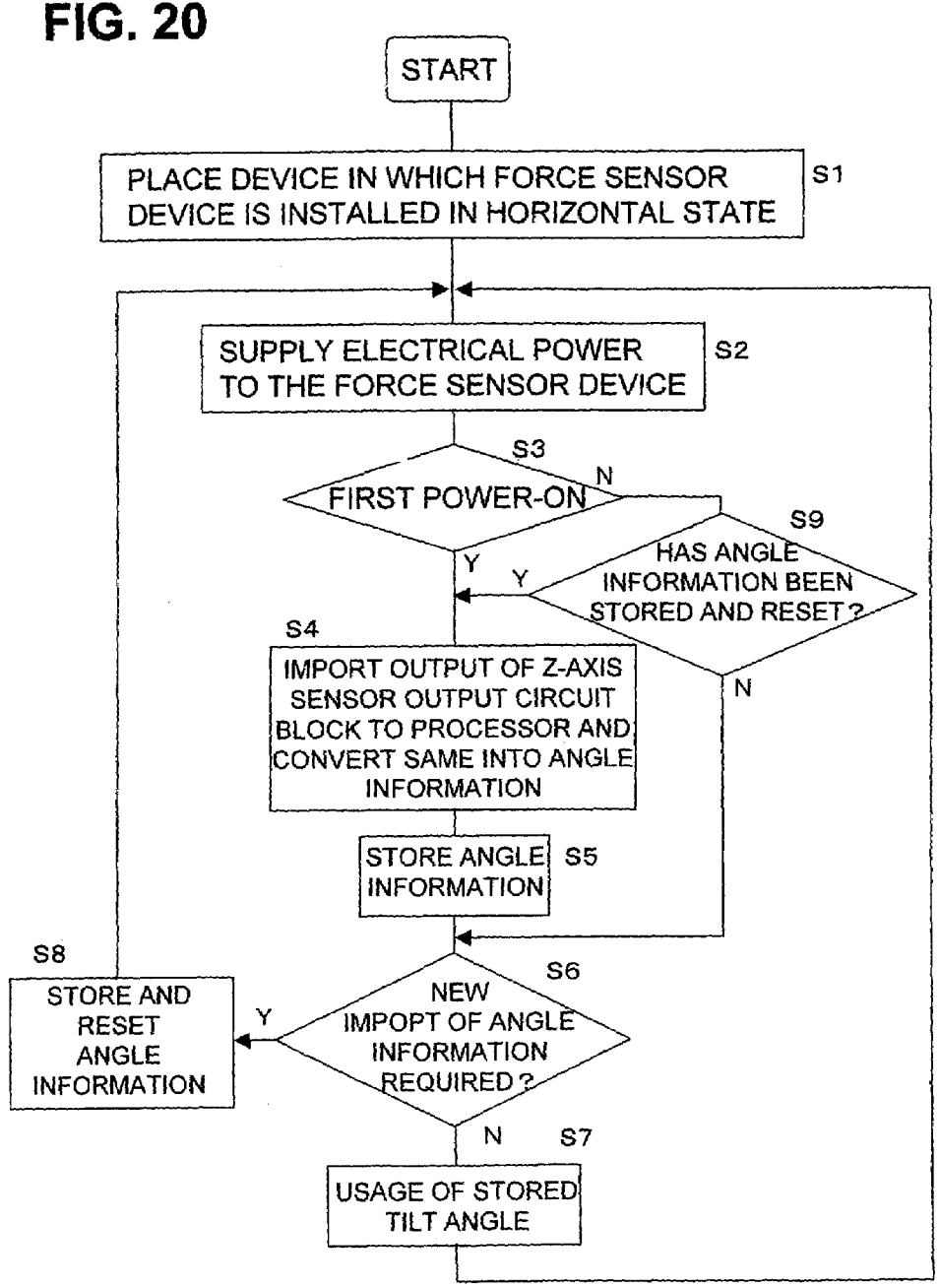
FIG. 20 represents the operation flow of the embodiment in FIG. 19 in a case where the tilt angle θ is found autonomously.
Figure 21:
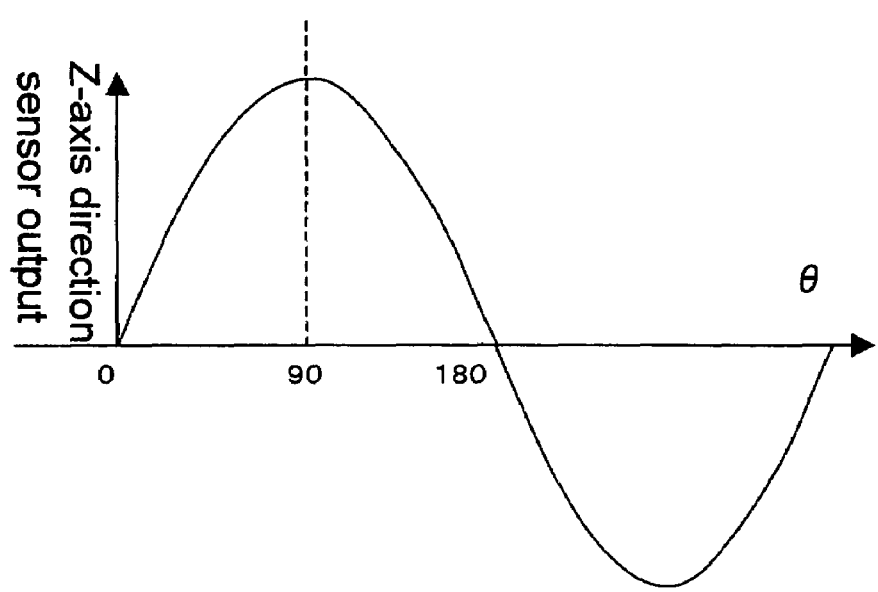
FIG. 21 illustrates the relationship between the output of the Z-axis direction force sensor and the tilt angle θ.

In FIG. 19, the description returns to one in which the tilt angle θ is found autonomously. FIG. 20 is an operation flow of an embodiment example for a case where the tilt angle θ is found autonomously. As a prerequisite, the device in which the force sensor device according to the present invention is installed is placed horizontally (step S1). At such time, the force delivered is only natural gravity. Here, when attention is drawn to the force sensor 1Z of the Z-axis direction when only natural gravity is delivered, the output in a state where the force sensor 1Z is horizontal (0° inclination) is 0, and the output in a state where the force sensor 1Z is in a vertical direction (90° inclination) is maximum, wherein the variation in the output follows a sine curve in accordance with tilt angle θ. This aspect is shown in FIG. 21.

Utilizing this fact, the relationship between the output of the force sensor 1Z, the inclination of the force sensor 1Z with respect to the vertical direction, and hence the tilt angle θ relative to the horizontal direction when the force sensor device is mounted is stored in a table beforehand in a memory 141 of the processing unit 140.

Power is supplied to the force sensor device in a state where the device in which the force sensor device is mounted is horizontal (processing step P2).

Here, when power is initially supplied to the force sensor device (step S2), in the processing unit 140, the output of the output circuit block 100Z corresponding with the force sensor 1Z is imported into the processing unit 140 and information on the corresponding angle θ is found by referencing the correspondence table that is stored in the memory 141 (step S4).

The information on the angle θ found at this time is stored in the memory 141 as an installation tilt angle (step S5).

Thereafter, if a new import of angle information is not required (step S6, N), the installation tilt angle θ stored in the memory 141 is used (step S7). As one usage aspect of the installation tilt angle θ, the input gain tuning resistor 111 of the input amplifier unit 110 and the output gain tuning resistor 121 of the output amplifier unit 120 are tuned by referencing the lookup table 130 as illustrated in FIG. 11.

Furthermore, in step S6, if the new import of angle information is required (step S6, Y), the storage of angular information is reset and the processing returns to step S2 (step S8).

In addition, in step S3 of FIG. 20, if it is not the initial supply of power to the force sensor device (step S3, N), and if angle information of the memory 141 has not been reset, continuously imported angle information is used as is (step S9, N).

As a result of this constitution comprising the processing unit 140 shown in FIG. 19, the tilt angle at which the force sensor device itself is installed can be measured and used in the sensitivity tuning of the input amplifier unit 110 and output amplifier unit 120, whereby a more efficient assembly process is obtained.

Here, an example of a case where, in the flow of FIG. 20, angle information that has been stored in the memory 141 in step S6, Y and step S8 is first reset and then new angle information is imported, will be described.

This is an example in which, when the force sensor device of the present invention is integrated into a car navigation device and installed in an automobile, the force sensor device is used to prevent auto theft.

The tilt angle when the force sensor device is installed in an automobile is found autonomously by the force sensor device itself according to the earlier description, the input gain tuning resistor 111 of the input amplifier unit 110 and the output gain tuning resistor 121 of the output amplifier unit 120 are tuned accordingly.

Further, when the driver is away from the car, the above tilt angle θ information in memory 141 is reset in accordance with turning off the engine. Thereafter, when it is assumed that the car is being stolen, either the front or rear wheels of the car are jacked up so that the automobile is then tilted. Accordingly, the output of the Z-axis direction sensor 1Z of the force sensor device, which corresponds to a different state from the state in which the car is horizontal, is obtained.

Therefore, in a case where this automobile is in the stationary state and the output of the Z-axis direction sensor 1Z of the force sensor device changes, the anomaly is sensed by a control unit (not shown) and an alarm or the like is emitted, whereby theft of the vehicle can be prevented.

INDUSTRIAL APPLICABILITY

As per the above description of the embodiments of the invention with reference to the drawings, when the sensor device according to the present invention is mounted in a device that is to be detected, the sensor device can be used by means of program settings alone irrespective of the specified mount angle. Therefore, both work and costs can be reduced, which constitutes a major contribution to the industry.

What is claimed is:

1. A stress detection method for a sensor device with a multiple axis sensor comprising, as the multiple axis sensor, first and second sensors having detection axes of which are orthogonal to one other,
   wherein, when the detection axis of the first sensor forms an angle $\theta$ with the axis direction in which detected stress Ax is delivered, and the stress component of an axis direction that is perpendicular to the axis in which the detected stress Ax is delivered as Az,
   an output Apx of the axis direction of the first sensor is found as Apx=$\alpha_x$ (Ax ×cos $\theta$+Az×sin $\theta$), and
   an output Apz of the axis direction of the second sensor is found as Apz=$\alpha_z$ (Ax×sin $\theta$+Az×cos $\theta$), and, when $\alpha_x$ and $\alpha_z$ are detection sensitivity coefficients of the first and second sensors respectively, the detection sensitivitycoefficient $\alpha_z$ of the second sensor is set as $\alpha_z$=$\alpha_x$ tan $\theta$, the difference Apx−Apz between the output Apx and output Apz is found, and the detected stress Ax is found from the difference as Ax=(Apx−Apz)/$\alpha_x$(cos $\theta$−tan $\theta$×sin $\theta$).

2. The stress detection method for a sensor device with a multiple axis sensor according to claim 1, comprising:
   prestoring the relationship of correspondence between the output Apz in the axis direction of the second sensor and the angle $\theta$;
   keeping the force sensor device at rest such that the first axis is in a horizontal direction;
   finding the corresponding angle $\theta$ on the basis of the stored relationship of correspondence from the output of the second sensor thus found; and
   storing the angle $\theta$ thus found and finding the detection sensitivity coefficient of the corresponding second sensor based on the angle $\theta$ thus found.

3. A stress detection method for a sensor device with a multiple axis sensor comprising, as the multiple axis sensor:
   first and second sensors the directions of which form an angle $\Phi$ in mutually opposite directions with the direction of a detected stress F1; and
   a third sensor with a detection axis in a direction that is perpendicular to the plane formed with the detection axes of the first and second sensors,
   wherein, when the plane formed with the detection axes of the first and second sensors forms an angle $\theta$ with the axis direction of the detected stress F1, and the stress component in an axis direction that is perpendicular to the axis in which the detected stress F1 is delivered is F2,
   an output Fx of the axis direction of the first sensor is found as Fx=$\alpha_x$×(F1 ×cos $\Phi$×cos $\theta$−F2×sin $\theta$),
   an output Fy of an axis direction of the second sensor is found as Fy=$\alpha_y$×(F1×cos $\Phi$×cos $\theta$−F2×sin $\theta$),
   an output Fz of an axis direction of the third sensor is found as Fz=$\alpha_z$×(F1×sin $\theta$−F2×cos $\theta$), and
   the combined output F of the outputs Fx, Fy and Fz is found as F=Fx+Fy−Fz; and,
   when $\alpha_x$, $\alpha_y$ and $\alpha_z$ are detection sensitivity coefficients of the first, second, and third sensors respectively, the detection sensitivity coefficient $\alpha_z$ of the third sensor is $\alpha_z$=($\alpha_x$+$\alpha_y$)×tan $\theta$, and the detected stress F1 is then found from the composite output F as F1=F/{($\alpha_x$+$\alpha_y$) cos $\Phi$×cos $\theta$−$\alpha_z$×sin $\theta$}.

4. The stress detection method for a sensor device with a multiple axis sensor according to claim 3, comprising:
   prestoring the relationship of correspondence between an output Fz of the axis direction of the third sensor and the angle $\theta$;
   keeping the sensor device at rest such that the plane formed with the detection axes of the first and second sensors is placed in a horizontal direction;
   finding the corresponding angle $\theta$ on the basis of the stored relationship of correspondence from the output of the third sensor thus found; and
   storing the angle $\theta$ thus found and finding the corresponding detection sensitivity coefficient of the third sensor based on the angle $\theta$ thus found.

5. The stress detection method for a sensor device with a multiple axis sensor according to claim 2 or 4, wherein the storage of the angle $\theta$ thus found can be reset.

6. A sensor device with a multiple axis sensor comprising:
   first and second sensors the detection axes of which are mutually orthogonal; and
   a circuit for processing the outputs of the first and second sensors,
   wherein, when the detection axis of the first sensor forms an angle $\theta$ with the axis direction in which the detected stress Ax is delivered and the stress component of an axis direction that is perpendicular to the axis in which the detected stress Ax is delivered is Az, the circuit outputs:
   Apx=$\alpha_x$ (Ax×cos $\theta$+Az×sin $\theta$) as an output in the axis direction of the first sensor, and
   Apz=$\alpha_z$ (Ax×sin $\theta$+Az×cos $\theta$) as an output in the axis direction of the second sensor,
   where $\alpha_x$ and $\alpha_z$ are detection sensitivity coefficients of the first and second sensors respectively and the detection sensitivity coefficient $\alpha_z$ of the second sensor is set as $\alpha_z$=$\alpha_x$ tan $\theta$;
   the difference Apx−Apz between the output Apx and output Apz is found; and
   the detected stress Ax is detected from the difference and outputted as Ax=(Apx −Apz)/$\alpha_x$(cos $\theta$−tan $\theta$×sin $\theta$).

7. The sensor device with a multiple axis sensor according to claim 6, comprising:
   prestoring the relationship of correspondence between the output Apz of the axis direction of the second force sensor and the angle $\theta$;
   keeping the force sensor device at rest such that the first axis is in a horizontal direction;
   finding the corresponding angle $\theta$ on the basis of the stored relationship of correspondence from the output of the second sensor thus found; and
   storing the angle $\theta$ thus found and establishing the detection sensitivity coefficient for the angle $\theta$ thus found.

8. The sensor device with a multiple axis sensor according to claims 7, wherein the storage of the angle $\theta$ thus found can be reset.

9. A sensor device with a multiple axis sensor comprising, as the multiple axis sensor:
   first and second sensors that form an angle $\Phi$ in mutually opposite directions with the axis direction in which the detected stress F1 is delivered; and a third sensor with a detection axis in a direction that is perpendicular to the plane formed with the detection axes of the first and second sensors, the plane formed with the first and second sensors forming an angle $\theta$ with the axis direction in which the detected stress F1 is delivered; and a circuit that processes the outputs of the first, second, and third sensors, such that, when the stress component in an axis direction that is perpendicular to the axis in which the detected stress F1 is delivered is F2, the circuit outputs:

an output Fx of the axis direction of the first sensor as $Fx=\alpha_x \times (F1 \times \cos\Phi \times \cos\theta - F2 \times \sin\theta)$, an output Fy of the axis direction of the second sensor as $Fy=\alpha_y \times (F1 \times \cos\Phi \times \cos\theta - F2 \times \sin\theta)$, an output Fz of the axis direction of the second sensor as $Fz=\alpha_z \times (F1 \times \sin\theta - F2 \times \cos\theta)$, and the combined output F of the outputs Fx, Fy and Fz as $F=Fx+Fy-Fz$; and, wherein $\alpha_x$, $\alpha_y$ and $\alpha_z$ are detection sensitivity coefficients of the first, second, and third sensors respectively, the detection sensitivity coefficient $\alpha_z$ of the third sensor is $\alpha_z=(\alpha_x+\alpha_y)\times\tan\theta$, and the detected stress F1 is obtained from the composite output F and outputted as $F1=F/\{(\alpha_x+\alpha_y)\cos\Phi\times\cos\theta-\alpha_z\times\sin\theta\}$.

10. The sensor device with a multiple axis sensor according to claim 9, wherein the relationship of correspondence between the output Fz of the axis direction of the third sensor and the angle $\theta$ is prestored;

the sensor device is kept in rest such that the plane formed with the detection axes of the first and second sensors is placed in a horizontal direction;

the corresponding angle $\theta$ is then found on the basis of the stored relationship of correspondence from the output of the third sensor thus found; and the angle $\theta$ thus found is stored and the corresponding detection sensitivity coefficient of the third sensor is established from the angle $\theta$ thus found.

11. The sensor device with a multiple axis sensor according to claim 10, wherein the storage of the angle $\theta$ thus found can be reset.

* * * * *